(12) United States Patent
Shim et al.

(10) Patent No.: US 12,122,710 B2
(45) Date of Patent: Oct. 22, 2024

(54) GLASS ARTICLE AND DISPLAY DEVICE INCLUDING THE SAME

(71) Applicant: SAMSUNG DISPLAY CO., LTD., Yongin-si (KR)

(72) Inventors: Gyu In Shim, Yongin-si (KR); Seung Kim, Seongnam-si (KR); Byung Hoon Kang, Hwaseong-si (KR); Young Ok Park, Seoul (KR); Su Jin Sung, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/515,164

(22) Filed: Nov. 20, 2023

(65) Prior Publication Data

US 2024/0083811 A1 Mar. 14, 2024

Related U.S. Application Data

(62) Division of application No. 17/816,710, filed on Aug. 1, 2022, now Pat. No. 11,820,702, which is a division
(Continued)

(30) Foreign Application Priority Data

Apr. 13, 2020 (KR) .................. 10-2020-0044473

(51) Int. Cl.
  *B32B 15/04* (2006.01)
  *B32B 17/06* (2006.01)
  *C03C 21/00* (2006.01)
(52) U.S. Cl.
  CPC .................. *C03C 21/002* (2013.01)

(58) Field of Classification Search
  CPC .................................................. C03C 21/002
  (Continued)

(56) References Cited

U.S. PATENT DOCUMENTS 10,640,420 B2 * 5/2020 Amin .................... C03C 21/002
10,934,209 B2 * 3/2021 Schneider ............... C03C 3/097
(Continued)

FOREIGN PATENT DOCUMENTS

CN 106604903 A 4/2017
CN 107074638 A 8/2017
(Continued)

OTHER PUBLICATIONS

Chinese Office Action issued in corresponding CN Application No. 202110318058.0, dated Apr. 29, 2024, 10 pages.

*Primary Examiner* — Lauren R Colgan
(74) *Attorney, Agent, or Firm* — Lewis Roca Rothgerber Christie LLP

(57) ABSTRACT

A glass article includes a first surface, a second surface opposed to the first surface, a first compressive region extending from the first surface to a first compression depth, a second compressive region extending from the second surface to a second compression depth and a tensile region between the first compression depth and the second compression depth. A stress profile of the first compressive region includes a first segment located between the first surface and a first transition point and a second segment located between the first transition point and the first compression depth. A depth from the first surface to the first transition point ranges from 6.1 μm to 8.1 μm. A compressive stress at the first transition point ranges from 207 MPa to 254 MPa. A stress-depth ratio of the first transition point ranges from 28 MPa/μm to 35 MPa/μm.

12 Claims, 13 Drawing Sheets

Related U.S. Application Data of application No. 17/093,041, filed on Nov. 9, 2020, now Pat. No. 11,420,903.

(58) Field of Classification Search
USPC .......................................................... 428/410
See application file for complete search history.

(56) References Cited

U.S. PATENT DOCUMENTS

| | | | |
|---|---|---|---|
| 11,021,393 B2 | 6/2021 | Oram et al. | |
| 11,028,014 B2 | 6/2021 | Harris et al. | |
| 11,084,756 B2* | 8/2021 | Amin | C03C 3/097 |
| 11,312,656 B2* | 4/2022 | Imakita | C03C 3/083 |
| 11,339,082 B2* | 5/2022 | Dietrich | C03C 3/097 |
| 11,339,088 B2* | 5/2022 | Gross | C03C 21/002 |
| 11,492,291 B2* | 11/2022 | Bookbinder | C03C 21/002 |
| 2015/0030834 A1 | 1/2015 | Morey et al. | |
| 2015/0147574 A1 | 5/2015 | Allan et al. | |
| 2015/0239775 A1 | 8/2015 | Amin et al. | |
| 2015/0239776 A1* | 8/2015 | Amin | G06F 1/1637 |
| | | | 428/220 |
| 2015/0368153 A1* | 12/2015 | Pesansky | C03C 3/097 |
| | | | 428/220 |
| 2016/0122239 A1* | 5/2016 | Amin | C03C 21/002 |
| | | | 428/220 |
| 2016/0122240 A1* | 5/2016 | Oram | C03C 21/002 |
| | | | 501/63 |
| 2016/0257605 A1 | 9/2016 | Amin et al. | |
| 2017/0158556 A1 | 6/2017 | Dejneka et al. | |
| 2017/0197869 A1 | 7/2017 | Beall et al. | |
| 2018/0297892 A1 | 10/2018 | Lee et al. | |
| 2019/0202735 A1 | 7/2019 | Oram et al. | |
| 2021/0155533 A1* | 5/2021 | Oram | C03C 3/097 |

FOREIGN PATENT DOCUMENTS

| | | |
|---|---|---|
| CN | 107108345 A | 8/2017 |
| CN | 108609866 A | 10/2018 |
| CN | 110002743 A | 7/2019 |
| CN | 110372229 A | 10/2019 |
| EP | 3838860 A1 | 6/2021 |
| KR | 10-2017-0036067 A | 3/2017 |
| KR | 10-2018-0132077 A | 12/2018 |
| KR | 10-1927014 B1 | 12/2018 |

* cited by examiner

GLASS ARTICLE AND DISPLAY DEVICE INCLUDING THE SAME

CROSS-REFERENCE TO RELATED APPLICATIONS

This application is a divisional of U.S. patent application Ser. No. 17/816,710, filed Aug. 1, 2022, which is a divisional of U.S. patent application Ser. No. 17/093,041, filed Nov. 9, 2020, now U.S. Pat. No. 11,420,903, which claims priority to and the benefit of Korean Patent Application No. 10-2020-0044473, filed Apr. 13, 2020, the entire content of all of which is incorporated herein by reference.

BACKGROUND

1. Field

The present disclosure relates to a glass article and a display device including the same.

2. Description of the Related Art

Glass articles are widely utilized in electronic devices including display devices, construction materials, and so on. For example, a glass article is applied to a substrate of a flat panel display device such as a liquid crystal display (LCD), an organic light emitting display (OLED) and an electrophoretic display (EPD), or to a cover window of the flat panel display device for protecting it.

As portable electronic devices such as smart phones and tablet PCs have become popular, glass articles applied to them are frequently exposed to external impacts. Accordingly, it is useful to develop a glass article which is thin for portability and can withstand external impacts. Attempts have been made to improve the strength of a glass article by thermal or chemical strengthening, but more precise stress profile management is required to meet customer needs.

SUMMARY

Aspects of the present disclosure are directed towards a glass article having good strength through a precise stress profile.

Aspects of the present disclosure also are directed towards a display device including a glass article having good strength through a precise stress profile.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an embodiment, there is provided a glass article including: a first surface; a second surface opposed to the first surface; a first compressive region extending from the first surface to a first compression depth; a second compressive region extending from the second surface to a second compression depth; and a tensile region between the first compression depth and the second compression depth, wherein a stress profile of the first compressive region includes a first segment located between the first surface and a first transition point and a second segment located between the first transition point and the first compression depth, wherein a depth from the first surface to the first transition point ranges from 6.1 μm to 8.1 μm, wherein a compressive stress at the first transition point ranges from 207 MPa to 254 MPa, and wherein a stress-depth ratio at the first transition point ranges from 28 MPa/μm to 35 MPa/μm.

A compressive energy of the first compressive region may range from 12,800 J/mm$^2$ to 15,645 J/mm$^2$.

A first compressive energy of the first segment may be smaller than a second compressive energy of the second segment.

The second compressive energy may have a magnitude of 2 to 5 times the first compressive energy.

The first compressive energy may range from 2,866 J/mm$^2$ to 3,504 J/mm$^2$, and the second compressive energy may range from 9,334 J/mm$^2$ to 12,141 J/mm$^2$.

A compressive stress at the first surface may range from 700 MPa to 950 MPa.

The compressive stress at the first transition point may be 0.218 to 0.363 times the compressive stress of the first surface.

The first compression depth may range from 125 μm to 135 μm.

The depth of the first transition point may be 0.045 to 0.065 times the first compression depth.

The first segment may have a first slope, the second segment may have a second slope, a tangent line of the stress profile at the first transition point may have a third slope, and wherein an absolute value of the third slope may be smaller than an absolute value of the first slope and greater than an absolute value of the second slope.

The absolute value of the third slope may be in a range of 19 MPa/μm to 22 MPa/μm.

A y-intercept of the tangent line of the stress profile at the first transition point may be in a range of 350 MPa to 420 MPa.

The glass article may contain lithium aluminosilicate.

The first compression depth may be a maximum penetration depth of sodium ions, and wherein the depth of the first transition point may be a maximum penetration depth of potassium ions.

A stress profile of the second compressive region may include a third segment located between the second surface and a second transition point and a fourth segment located between the second transition point and the second compression depth, wherein a depth from the second surface to the second transition point may range from 6.1 μm to 8.1 μm, wherein a compressive stress at the second transition point may range from 207 MPa to 254 MPa, and wherein a stress-depth ratio at the second transition point may range from 28 MPa/μm to 35 MPa/μm.

The stress profile of the second compressive region may have a symmetrical relationship with the stress profile of the first compressive region.

A maximum tensile stress of the tensile region may be in a range of 75 MPa to 85 MPa.

A median of a limited drop height may be greater than or equal to 80 cm in a ball-on-ring (BOR) test of the glass article utilizing a ball of 60 g for 10 or more samples.

According to an embodiment, there is provided a glass article having a thickness of 0.45 mm to 0.8 mm, including: a first surface; a second surface opposed to the first surface; a first compressive region extending from the first surface to a first compression depth; a second compressive region extending from the second surface to a second compression depth; and a tensile region between the first compression depth and the second compression depth, wherein a compressive stress at the first surface ranges from 700 MPa to 950 MPa, wherein the first compression depth ranges from 125 μm to 135 μm, and wherein a stress profile of the first compressive region has an inflection point at a depth of 6.1

μm to 8.1 μm and a compressive stress at the inflection point in a stress range of 207 MPa to 254 MPa.

A median of a limited drop height may be greater than or equal to 80 cm in a ball-on-ring (BOR) test of the glass article utilizing a ball of 60 g for 10 or more samples.

The glass article may contain lithium aluminosilicate.

According to an embodiment, there is provided a display device including: a display panel including a plurality of pixels; a cover window above the display panel; and an optically transparent bonding layer between the display panel and the cover window, wherein the cover window includes: a first surface; a second surface opposed to the first surface; a first compressive region extending from the first surface to a first compression depth; a second compressive region extending from the second surface to a second compression depth; and a tensile region between the first compression depth and the second compression depth, wherein a stress profile of the first compressive region includes a first segment located between the first surface and a first transition point and a second segment located between the first transition point and the first compression depth, wherein a depth from the first surface to the first transition point ranges from 6.1 μm to 8.1 μm, wherein a compressive stress at the first transition point ranges from 207 MPa to 254 MPa, and wherein a stress-depth ratio at the first transition point ranges from 28 MPa/μm to 35 MPa/μm.

The cover window may include a glass article containing lithium aluminosilicate and having a thickness of 0.45 mm to 0.8 mm, wherein a compressive energy of the first compressive region may range from 12,800 J/mm$^2$ to 15,645 J/mm$^2$, wherein a first compressive energy of the first segment may range from 2,866 J/mm$^2$ to 3,504 J/mm$^2$, wherein a second compressive energy of the second segment may range from 9,334 J/mm$^2$ to 12,141 J/mm$^2$, wherein a compressive stress at the first surface may range from 700 MPa to 950 MPa, and wherein the first compression depth may range from 125 μm to 135 μm.

According to the glass article and the display device according to embodiments, by controlling (e.g., precisely controlling) the stress profile, it can be implemented to have a high strength such that it is not easily broken by an external impact.

The aspects and features of the present disclosure are not limited to the aforementioned aspects and features, and various other aspects and features are included in the present specification.

BRIEF DESCRIPTION OF THE DRAWINGS

The above and other aspects and features of the present disclosure will become more apparent by describing in more detail embodiments thereof with reference to the attached drawings, in which.

DETAILED DESCRIPTION

Figure 1:
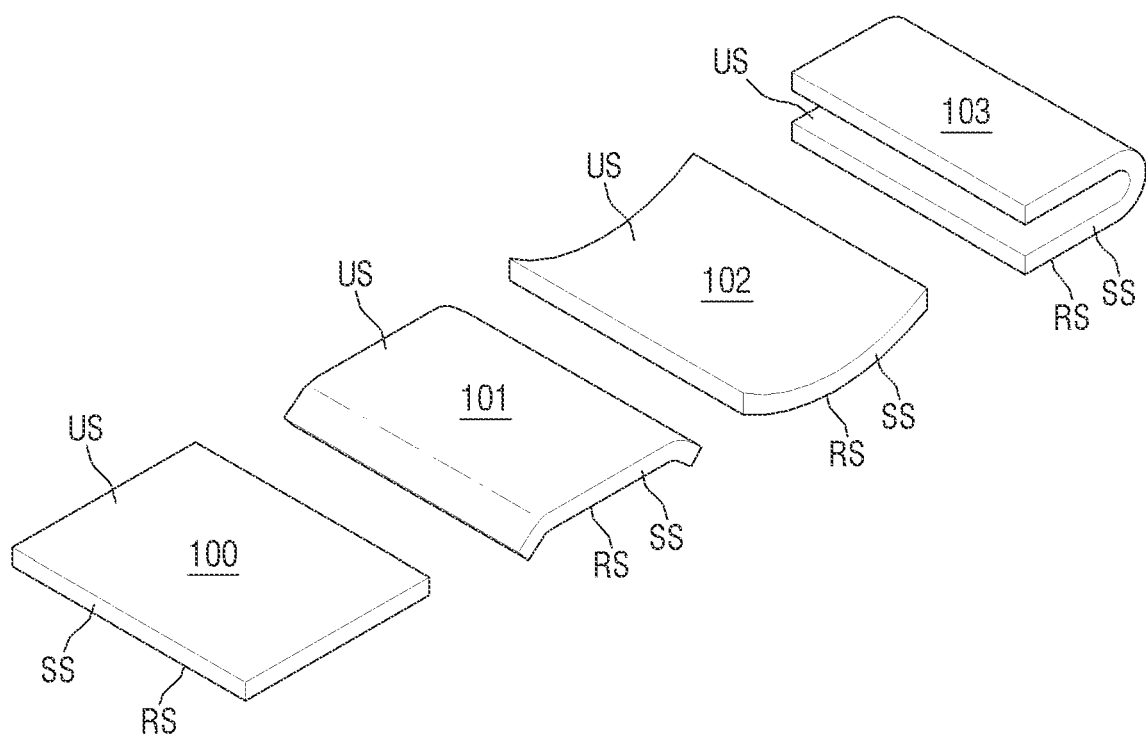
FIG. 1 is a perspective view of glass articles according to various embodiments.

Features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the present disclosure to those of ordinary skill in the art, and the present disclosure will only be defined by the appended claims and equivalents thereof. Like reference numerals refer to like elements throughout the specification. As used herein, the use of the term "may," when describing embodiments of the present disclosure, refers to "one or more embodiments of the present disclosure." As used herein, the term "substantially," "about," "approximately," and similar terms are used as terms of approximation and not as terms of degree, and are intended to account for the inherent deviations in measured or calculated values that would be recognized by those of ordinary skill in the art. As used herein, the singular forms "a", "an" and "the" are intended to include the plural forms as well, unless the context clearly indicates otherwise.

It will be understood that when an element or layer is referred to as being "on", "connected to" or "coupled to" another element or layer, it can be directly on, connected to or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

As used herein, the term "glass article" refers to an article made entirely or partially of glass.

Hereinafter, embodiments of the present disclosure will be described with reference to the accompanying drawings.

FIG. 1 is a perspective view of glass articles according to various embodiments.

Glass is utilized as a cover window for protecting a display (e.g., display panel or display device), a substrate for a display panel, a substrate for a touch panel, an optical member such as a light guide plate and the like in electronic devices including a display, such as a tablet PC, a notebook PC, a smart phone, an electronic book, a television and a PC monitor as well as a refrigerator and a cleaning machine including a display screen. Glass may also be employed as a cover glass for a dashboard of a vehicle, a cover glass for solar cells, interior materials for construction materials, windows for buildings and houses, and the like.

It is useful for some glass articles to have high strength. For example, when glass is employed as a window, it is useful or desirable for the glass to have a small thickness to meet the requirements of high transmittance and low weight, and also useful or desirable for the glass to have strength such that it is not easily broken by an external impact. Strengthened glass can be produced by, for example, chemical strengthening or thermal strengthening. Examples of strengthened glass having various shapes are shown in FIG. 1.

Referring to FIG. 1, in an embodiment, a glass article 100 may have a flat sheet shape or a flat plate shape. In another embodiment, glass articles 101, 102 and 103 may have a three-dimensional shape including bent portions. For example, a surface (e.g., upper or lower surface) of each of the glass articles 101, 102, and 103 may extend in three dimensions. For example, the edges of the flat portion (e.g., upper or lower surface) may be bent (e.g., the glass article 101), or the flat portion may be entirely curved (e.g., the glass article 102) or folded (e.g., the glass article 103).

The planar shape of the glass articles 100 to 103 may be a rectangular shape, but is not limited thereto, and may have various suitable shapes such as a rectangular shape with rounded corners, a square shape, a circular shape, and an elliptical shape. In the following embodiment, a flat plate having a rectangular planar shape is described as an example of the glass articles 100 to 103, but the present disclosure is not limited thereto.

Figure 2:
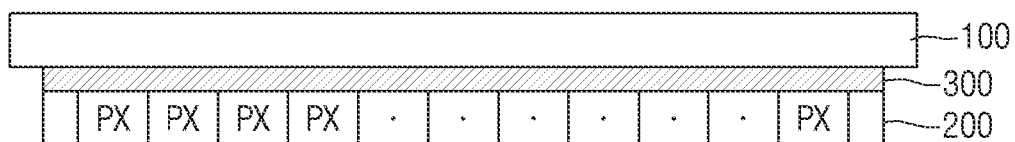
FIG. 2 is a cross-sectional view illustrating an example in which a glass article according to an embodiment is applied to a cover window of a display device.

FIG. 2 is a cross-sectional view illustrating an example in which a glass article according to an embodiment is applied to a cover window of a display device.

Referring to FIG. 2, a display device 500 may include a display panel 200, a glass article 100 disposed on the display panel 200 and serving as a cover window, and an optically transparent bonding layer 300 disposed between the display panel 200 and the glass article 100 to bond the display panel 200 and the glass article 100 to each other.

Examples of the display panel 200 may include not only a self-luminous display panel such as an organic light emitting display (OLED) panel, an inorganic electroluminescence (EL) display panel, a quantum dot (QED) display panel, a micro-LED display panel, a nano-LED display panel, a plasma display panel (PDP), a field emission display (FED) panel and a cathode ray tube (CRT) display panel, but also a light receiving display panel such as a liquid crystal display (LCD) panel and an electrophoretic display (EPD) panel.

The display panel 200 includes a plurality of pixels PX and may display an image by utilizing light emitted from each pixel PX. The display device 500 may further include a touch member. In an embodiment, the touch member may be embedded in the display panel 200. For example, because the touch member may be directly formed on a display member of the display panel 200, the display panel 200 itself may perform a touch function. In another embodiment, the touch member may be manufactured separately from the display panel 200 and then coupled (e.g., attached) to the top surface of the display panel 200 by an optically transparent bonding layer.

The glass article 100 is disposed above the display panel 200 to protect the display panel 200. The glass article 100 may be larger in size than the display panel 200 so that the side surface thereof may protrude outward from the side surface of the display panel 200, but the present disclosure is not limited thereto. The display device 500 may further include a printed layer disposed on at least one surface of the glass article 100 at an edge portion of the glass article 100. The printed layer may prevent the bezel area of the display device 500 from being visible from the outside or may reduce the visibility of the bezel area of the display device 500 from the outside, and the printed layer may perform a decoration function in some cases.

The optically transparent bonding layer 300 is disposed between the display panel 200 and the glass article 100. The optically transparent bonding layer 300 serves to fix the glass article 100 onto the display panel 200. The optically transparent bonding layer 300 may include an optically clear adhesive (OCA), an optically clear resin (OCR), or the like.

Hereinafter, the strengthened glass article 100 will be described in more detail.

Figure 3:
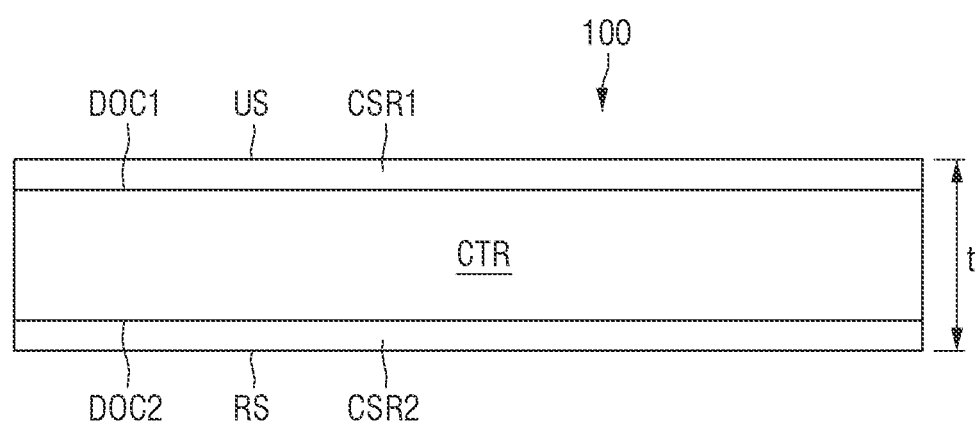
FIG. 3 is a cross-sectional view of a glass article having a flat plate shape according to an embodiment.

FIG. 3 is a cross-sectional view of a glass article having a flat plate shape according to an embodiment.

Referring to FIG. 3, the glass article 100 may include a first surface US, a second surface RS and a side surface SS. In the glass article 100 having a flat plate shape, the first surface US and the second surface RS are main surfaces having a large area, and the side surface SS is an outer surface coupling (e.g., connecting) the first surface US with the second surface RS.

The first surface US and the second surface RS are opposed to each other in the thickness direction. For example, the first surface US may be an upper surface of the glass article 100, and the second surface RS may be a lower surface of the glass article 100. When the glass article 100 serves to transmit light in the same manner as the cover window (e.g., when the glass article 100 serves as a cover window) of a display, the light may be mainly incident on one of the first surface US and the second surface RS and may pass through the other one.

A thickness t of the glass article 100 is defined as a distance between the first surface US and the second surface RS. The thickness t of the glass article 100 may range, but is not limited to, from 0.1 mm to 2 mm. As used herein, the term "mm" may refer to a distance equal to $10^{-3}$ meters. In an embodiment, the thickness t of the glass article 100 may be about 0.8 mm or less. In another embodiment, the thickness t of the glass article 100 may be about 0.75 mm or less. In yet another embodiment, the thickness t of the glass article 100 may be about 0.7 mm or less. In yet another embodiment, the thickness t of the glass article 100 may be about 0.65 mm or less. In yet another embodiment, the thickness t of the glass article 100 may be about 0.6 mm or less. In yet another embodiment, the thickness t of the glass article 100 may be about 0.55 mm or less. In yet another embodiment, the thickness t of the glass article 100 may be about 0.5 mm or less. In yet another embodiment, the thickness t of the glass article 100 may be about 0.3 mm or less. In some embodiments, the thickness t of the glass article 100 may range from 0.45 mm to 0.8 mm or from 0.5 mm to 0.75 mm. The glass article 100 may have a uniform thickness t, but is not limited thereto and may have a different thickness t for each region.

The glass article 100 may be strengthened to have a set or predetermined stress profile therein. The strengthened glass article 100 more efficiently prevents or reduces the generation of cracks, propagation of cracks, breakage and the like due to external impact than the glass article 100 before strengthening. The glass article 100 strengthened by a strengthening process may have a different stress for each region. For example, compressive regions CSR1 and CSR2 to which a compressive stress is applied may be disposed in the vicinity of the surface of the glass article 100. For example, the compressive region CSR1 may be at (e.g., near or adjacent to) the first surface US, and the compressive region CSR2 may be at (e.g., near or adjacent to) the second surface RS. A tensile region CTR to which a tensile stress is applied may be disposed inside the glass article 100. For example, the tensile region CTR may be between the compressive region CSR1 and the compressive region CSR2. A boundary between the compressive region CSR1, CSR2 and a tensile region CTR (e.g., each of a boundary between the compressive region CSR1 and the tensile region CTR and a boundary between the compressive region CSR2 and the tensile region CTR) may have a stress value of zero. The compressive stress in one compressive region CSR1, CSR2 may vary in its stress value depending on the position (e.g. depth from the surface). Also, the tensile region CTR may have a different stress value depending on the depth from the surface US, RS.

The position of the compressive region CSR1, CSR2, the stress profile in the compressive region CSR1, CSR2, the compressive energy of the compressive region CSR1, CSR2, the tensile energy of the tensile region CTR or the like in the glass article 100 has a great influence (e.g., effect) on the mechanical properties of the glass article 100, such as the surface strength. A more detailed description thereof will be given later.

Figure 4:
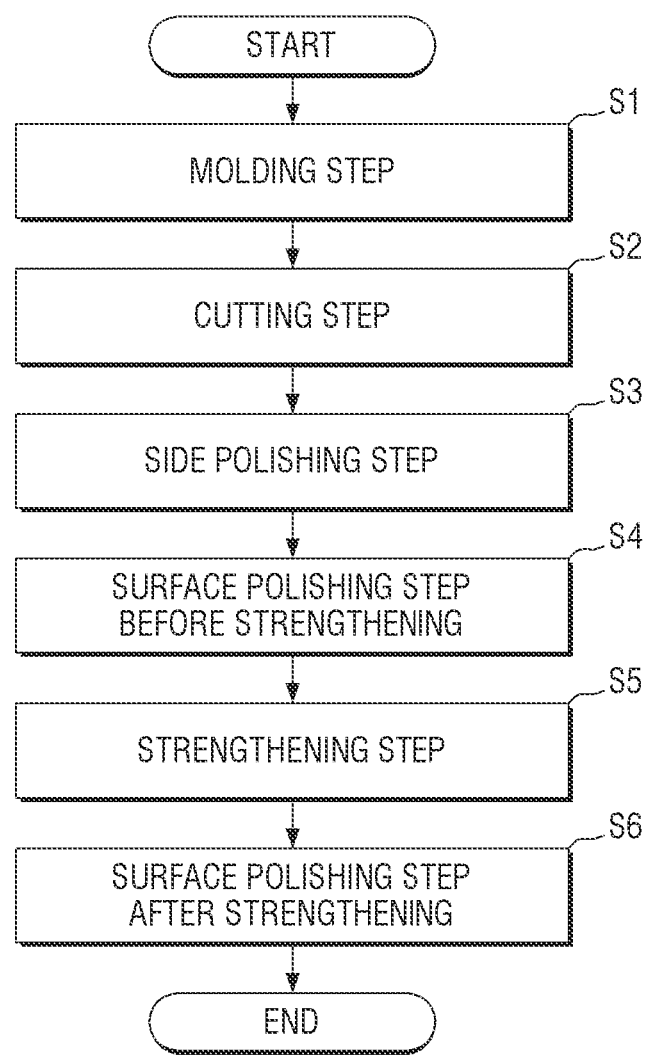
FIG. 4 is a flowchart showing the tasks of a method for producing a glass article according to an embodiment.
Figure 5:
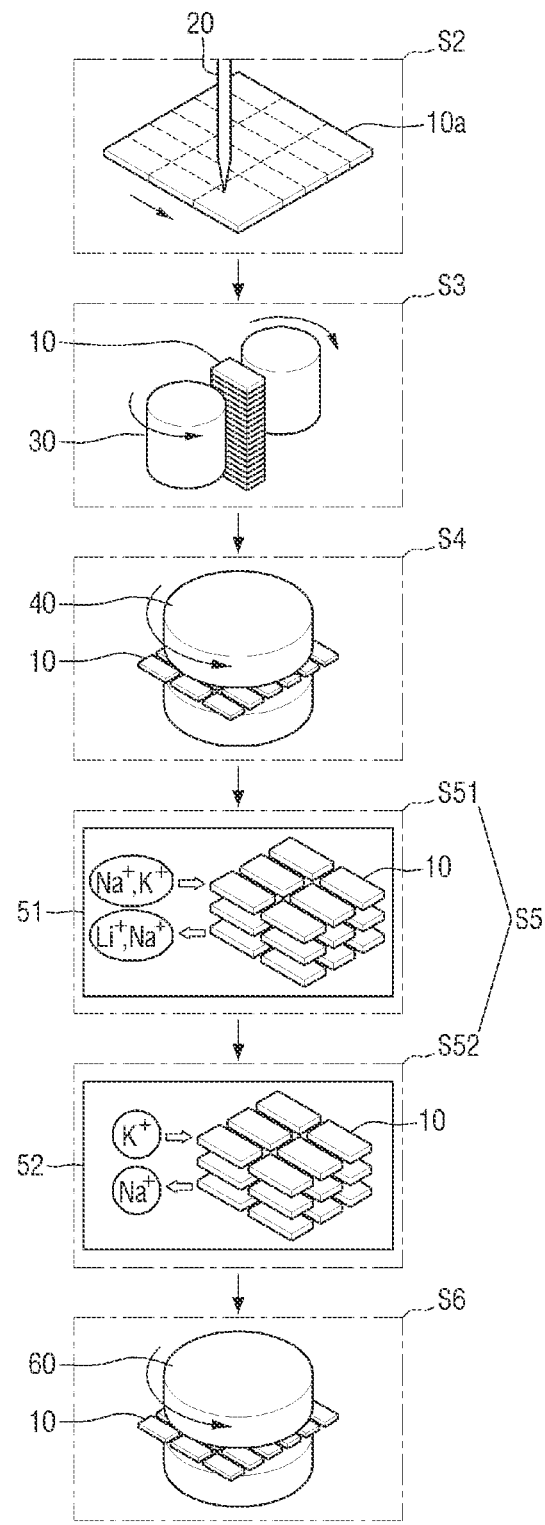
FIG. 5 is a diagram schematically showing the tasks of FIG. 4 from a cutting task to a surface polishing task after strengthening.

FIG. 4 is a flowchart showing tasks of a method for producing a glass article according to an embodiment. FIG. 5 is a diagram schematically showing the tasks of FIG. 4 from a cutting task to a surface polishing task after strengthening.

Referring to FIGS. 4 and 5, the method for producing the strengthened glass article 100 may include a molding task S1, a cutting task S2, a side polishing task S3, a surface polishing task S4 before strengthening, a strengthening task S5, and a surface polishing task S6 after strengthening.

The molding task S1 may include preparing a glass composition and molding the glass composition.

The glass composition may include (e.g., be) various suitable compositions known or available in the art. In an embodiment, the glass composition may include (e.g., be) Lithium-Alumina-Silicon (LAS) glass ceramics containing lithium aluminosilicate. For example, the glass composition may contain 50 to 80 mol % of $SiO_2$, 1 to 30 mol % of $Al_2O_3$, 0 to 5 mol % of $B_2O_3$, 0 to 8 mol % of $P_2O_5$, 3 to 20 mol % of $Li_2O$, 0 to 20 mol % of $Na_2O$, 0 to 10 mol % of $K_2O$, 0 to 20 mol % of MgO, 0 to 10 mol % of CaO, 0 to 10 mol % of SrO, 0 to 10 mol % of BaO, 0 to 0.5 mol % of $5n02$, 0 to 10 mol % of ZnO, 0 to 1 mol % of $TiO_2$, and 0 to 8 mol % of $ZrO_2$. As used herein, the term "mol %" may refer to a percentage of moles of a component in a composition with respect to the sum of all moles of the composition. The term "the content is 0 mol %" as used herein means that it does not substantially contain the corresponding component. The term "(composition) does not substantially contain (a certain component)" as used herein means that the certain component is not intentionally contained in raw materials and the like, and includes, for example, a case in which a tiny amount (e.g., 0.1 mol % or less) of impurities are inevitably contained.

In more detail with respect to each component of the glass composition, $SiO_2$ constitutes the skeleton (e.g., the majority or largest component of the composition by mol %, weight, etc.) of glass, may increase the chemical durability, and may serve to reduce the occurrence of cracks when scratches (indentations) are made on the glass surface. In order to fully perform this role, $SiO_2$ may be contained in an amount of 50 mol % or more. In order to exhibit (e.g., have) sufficient meltability, $SiO_2$ in the glass composition may have a content of up to 80 mol %.

$Al_2O_3$ serves to improve the frangibility (or breakage resistance) of glass. For example, $Al_2O_3$ may serve to generate a smaller number of fragments when the glass is broken. For example, when the glass is broken, the presence of $Al_2O_3$ in the glass may reduce the number of fragments that the glass is broken into compared to when the glass does not include $Al_2O_3$. In addition, $Al_2O_3$ may serve as an active component that improves the ion exchange performance (e.g., ion exchange rate or the amount of ions exchanged) during chemical strengthening and increases surface compressive stress after strengthening. When the content of $Al_2O_3$ is 1 mol % or more, the above-described function can be effectively performed. Meanwhile, in order to maintain the acid resistance and meltability of glass, the content of $Al_2O_3$ is preferably 30 mol % or less.

$B_2O_3$ enhances the chipping resistance of glass and improves the meltability of glass. In some embodiments, $B_2O_3$ is not contained (0 mol %). In some embodiments, $B_2O_3$ may be contained and may further improve the meltability of glass when contained in an amount of 0.5 mol % or more. $B_2O_3$ in a content of 5 mol % or less may be useful or advantageous in suppressing or reducing the occurrence of striae during melting.

$P_2O_5$ improves the ion exchange performance and chipping resistance. In some embodiments, $P_2O_5$ is not contained (0 mol %). In some embodiments, $P_2O_5$ may be contained and may significantly perform the above-described function when contained in an amount of 0.5 mol % or more. $P_2O_5$ in a content of 8 mol % or less may be useful or advantageous in preventing a significant decrease, or in reducing a decrease, in frangibility (or breakage resistance) and acid resistance, and $P_2O_5$ in a content (e.g., concentration) of 4 mol % or less may be more effective in preventing or reducing a decrease in frangibility (or breakage resistance) and acid resistance.

$Li_2O$ serves to form (e.g., provide or improve) surface compressive stress by ion exchange. Lithium (Li) ions near the glass surface may be exchanged with Sodium (Na) ions or the like through an ion exchange process. $Li_2O$ may also serve to improve the frangibility (or breakage resistance) of glass. The content of $Li_2O$ for effective ion exchange is 3 mol % or more, and the content of $Li_2O$ is preferably 20 mol % or less in terms of acid resistance. For example, when the glass contains $Li_2O$ in a content of 3 mol % or more and 20 mol % or less, then the $Li_2O$ may improve ion exchange performance and may prevent or reduce a decrease in acid resistance.

$Na_2O$ serves to form surface compressive stress by ion exchange and improve the meltability of glass. Na ions near the glass surface may be exchanged with Potassium (K) ions or the like through an ion exchange process. In some embodiments, $Na_2O$ is not contained (i.e., 0 mol %). In some embodiments, $Na_2O$ may be contained and the content of $Na_2O$ is preferably 1 mol % or more to effectively perform the above-described role. If only a Li and Na ion exchange process is performed and a K ion exchange process is not performed, it may be preferable that the content of $Na_2O$ is 8 mol % or less for smooth Li and Na ion exchange. If a K ion exchange process is also performed, a larger amount of $Na_2O$ may be utilized. However, also in this case, it may be preferable that the content of $Na_2O$ is 20 mol % or less in terms of acid resistance.

$K_2O$ improves the ion exchange performance and is associated with the frangibility (or breakage resistance). In some embodiments, $K_2O$ is not contained. In some embodiments, $K_2O$ may be contained in an amount of 0.5 mol % or more to improve the ion exchange performance. In order to prevent an excessive decrease, or to reduce a decrease, in frangibility (or breakage resistance), the content of $K_2O$ may be 10 mol % or less.

MgO serves to increase the surface compressive stress and to improve the frangibility (or breakage resistance) of chemically strengthened glass. In some embodiments, MgO is not contained. In some embodiments, MgO may be contained in a content of 3 mol % or more to effectively perform the above-described role. MgO in a content of 20 mol % or less may be useful or advantageous in reducing the occurrence of devitrification during glass melting.

CaO serves to improve the meltability and frangibility (or breakage resistance) of glass. In some embodiments, CaO is not contained. In some embodiments, in order to effectively perform the above-described role, CaO is preferably contained in a content of 0.5 mol % or more. If the content of CaO is excessively high, the ion exchange performance may be degraded, and thus, the content of CaO is preferably 10 mol % or less.

SrO serves to improve the meltability and frangibility (or breakage resistance) of glass, similarly to CaO. In some embodiments, SrO is not contained. In order to effectively perform the above-described role, SrO is preferably contained in a content of 0.5 mol % or more. If the content of SrO is excessively high, the ion exchange performance may be degraded, and thus, the content of SrO is preferably 10 mol % or less.

BaO serves to improve the meltability and frangibility (or breakage resistance) of glass. In some embodiments, BaO is not contained. In order to effectively perform the above-described role, BaO is preferably contained in a content of 0.5 mol % or more. BaO in a content of 10 mol % or less may be useful or advantageous in preventing an excessive decrease, or in reducing a decrease, in ion exchange performance.

$SnO_2$ serves to improve the meltability of glass. $SnO_2$ may not only improve the meltability, but may also serve as a clarifier (e.g., a component that improves transmittance of visible light). If the content of $SnO_2$ is excessively high, the transmittance may be degraded, and thus, the content of $SnO_2$ is preferably 0.5 mol % or less. In some embodiments, $SnO_2$ is not contained.

ZnO serves to improve the meltability of glass. In some embodiments, ZnO is not contained. In some embodiments, ZnO may be contained and may significantly exhibit the effect of improving meltability when contained in a content of 0.25 mol % or more. In order to prevent or reduce a decrease in weatherability, the content of ZnO is preferably 10 mol % or less.

$TiO_2$ improves the frangibility (or breakage resistance) of chemically strengthened glass. In some embodiments, $TiO_2$ is not contained. In some embodiments, $TiO_2$ may be contained, and may significantly exhibit the effect of improving frangibility (or breakage resistance) when contained in a content of 0.1 mol % or more. In order to prevent or reduce devitrification during melting, the content of $TiO_2$ is preferably 1 mol % or less.

$ZrO_2$ may increase the surface compressive stress due to ion exchange and improve the frangibility (or breakage resistance) of glass. In some embodiments, $ZrO_2$ is not contained. In some embodiments $ZrO_2$ may be contained, and may effectively perform the above-described role when contained in a content of 0.5 mol % or more. $ZrO_2$ in a content of 8 mol % or less may be useful or advantageous in suppressing or reducing devitrification during melting.

The glass composition may further include components such as $Y_2O_3$, $La_2O3$, $Nb_2O_5$, $Ta_2O_5$ and $Gd_2O_3$ in addition to the components mentioned above. In addition, as a fining agent, $Sb_2O_3$, $CeO_2$, and/or $As_2O_3$ in a content of 0.5 mol % or less may be further included. The composition of the glass article 100 may be changed through a molding process, an ion exchange process, and the like, which will be described later.

The glass composition described above may be molded into a plate glass shape by various suitable methods known or available in the art. For example, it may be molded by a float process, a fusion draw process, a slot draw process, or the like.

The glass molded into a flat plate shape may be cut through the cutting task S2. The glass molded into a flat plate shape may have a different size than that of the final glass article 100. For example, glass molding may be performed to form a large-area substrate as a mother substrate 10a including a plurality of glass articles (e.g., from which a plurality of glass articles may be obtained). The mother substrate 10a may be cut into a plurality of glass cells 10 to produce a plurality of glass articles. For example, even though the final glass article 100 has a size (e.g., length) of about 6 inches, when glass is molded to have a size of several to several hundred times the size of the final glass article (e.g., 120 inches) and then cut, multiple glass articles (e.g., 400 glass articles) molded into a flat plate shape can be obtained at once (e.g., from the mother substrate 10a). In this way, process efficiency can be improved as compared with a case of molding an individual glass article separately. In addition, even when molding the glass corresponding to the size of one glass article, if the final glass article has a planar shape selected from among various suitable planar shapes, it can be made into a set, predetermined, or desired shape through a cutting process.

Cutting of the glass (e.g., mother substrate 10a) may be performed utilizing a cutting knife 20, a cutting wheel, a laser, or the like.

The cutting task S2 of glass may be performed before the strengthening task S5 of glass. The mother substrate 10a may be strengthened at once and then cut into the size of the final glass article. However, in this case, the cut surface (e.g., side surface of glass) may be put in a non-strengthened state. Accordingly, the strengthening task S5 may be performed after cutting is completed.

Between the cutting task S2 and the strengthening task S5 of glass, a polishing task before strengthening may be performed. The polishing task before strengthening may include the side polishing task S3 and the surface polishing task S4 before strengthening. In an embodiment, after the side polishing task S3 is performed first, the surface polishing task S4 before strengthening may be performed, but this order may be reversed.

The side polishing task S3 is a task of polishing the side surface of a cut glass cell 10. In the side polishing task S3, the side surface of the glass cell 10 is polished to have a smooth surface. Further, each side surface of the glass cell 10 may have a uniform surface (e.g., uniform roughness over the surface) through the side polishing task S3. For example, the cut glass cell 10 may include one or more cut surfaces. In some cut glass cells 10, two side surfaces of four side surfaces may be cut surfaces. In some other cut glass cells 10, three side surfaces of four side surfaces may be cut surfaces. In some other cut glass cells 10, all of four side surfaces may be cut surfaces. When a side surface is a cut surface, it may have different surface roughness from that of an uncut surface. In addition, even the cut surfaces may have different surface roughness. Therefore, by polishing each side surface through the side polishing task S3, each side surface may have uniform surface roughness and the like. Further, if there is a small crack on the side surface, it can be removed through the side polishing task S3.

The side polishing task S3 may be performed concurrently or simultaneously on a plurality of cut glass cells 10. For example, in a state where the plurality of cut glass cells 10 are stacked, the stacked glass cells 10 may be polished at the same time.

The side polishing task S3 may be performed by a mechanical polishing method or by a chemical mechanical polishing method utilizing a polishing apparatus 30. In an embodiment, two opposite side surfaces of the cut glass cells 10 may be polished concurrently or simultaneously, and then the other two opposite side surfaces may be polished concurrently or simultaneously, but the present disclosure is not limited thereto.

The surface polishing task S4 before strengthening may be performed such that each glass cell 10 has a uniform surface (e.g., uniform roughness over the surface). The surface polishing task S4 before strengthening may be performed separately for each cut glass cell 10. However, when a chemical mechanical polishing apparatus 40 is sufficiently large compared to the glass cell 10, the plurality of glass cells 10 may be horizontally arranged and then surface-polished concurrently or simultaneously.

The surface polishing task S4 before strengthening may be performed by chemical mechanical polishing. For example, first and second surfaces of the cut glass cell 10 are polished utilizing the chemical mechanical polishing apparatus 40 and a polishing slurry. In some embodiments, the first and second surfaces of the cut glass cell 10 correspond to the first surface US and second surface RS, respectively, of the final glass article 100 illustrated in FIG. 3. The first surface and the second surface may be polished concurrently or simultaneously. In some embodiments, one surface of the first and second surfaces may be polished first and then the other surface may be polished.

After the polishing task S4 before strengthening, the strengthening task S5 is performed. The strengthening task S5 may include chemical strengthening and/or thermal strengthening. In the case of the glass cell 10 having a thin thickness of 2 mm or less, particularly, about 0.75 mm or less, a chemical strengthening method may be appropriately applied for precise stress profile control. In the following embodiment, a case where a chemical strengthening method is applied for the strengthening task S5 of the glass cell 10 will be described as an example.

Chemical strengthening may be performed through an ion exchange process. The ion exchange process is a process of exchanging ions in the glass cell 10 with other ions. By performing the ion exchange process, the ions at or near the surface of the glass cell 10 can be replaced or exchanged with larger ions having the same valence or oxidation state. For example, the ions at or near the surface of the glass cell 10 may be replaced or exchanged with larger ions in a material (e.g., solution) in contact with the surface of the glass cell 10. For example, when the glass cell 10 contains a monovalent alkali metal such as Li+, Na+, K+ and/or Rb+, the monovalent cation on the surface may be replaced by Na+, K+, Rb+, or Cs+ ions with a larger ionic radius. The ion exchange process will be described in more detail with reference to FIG. 6.

Figure 6:
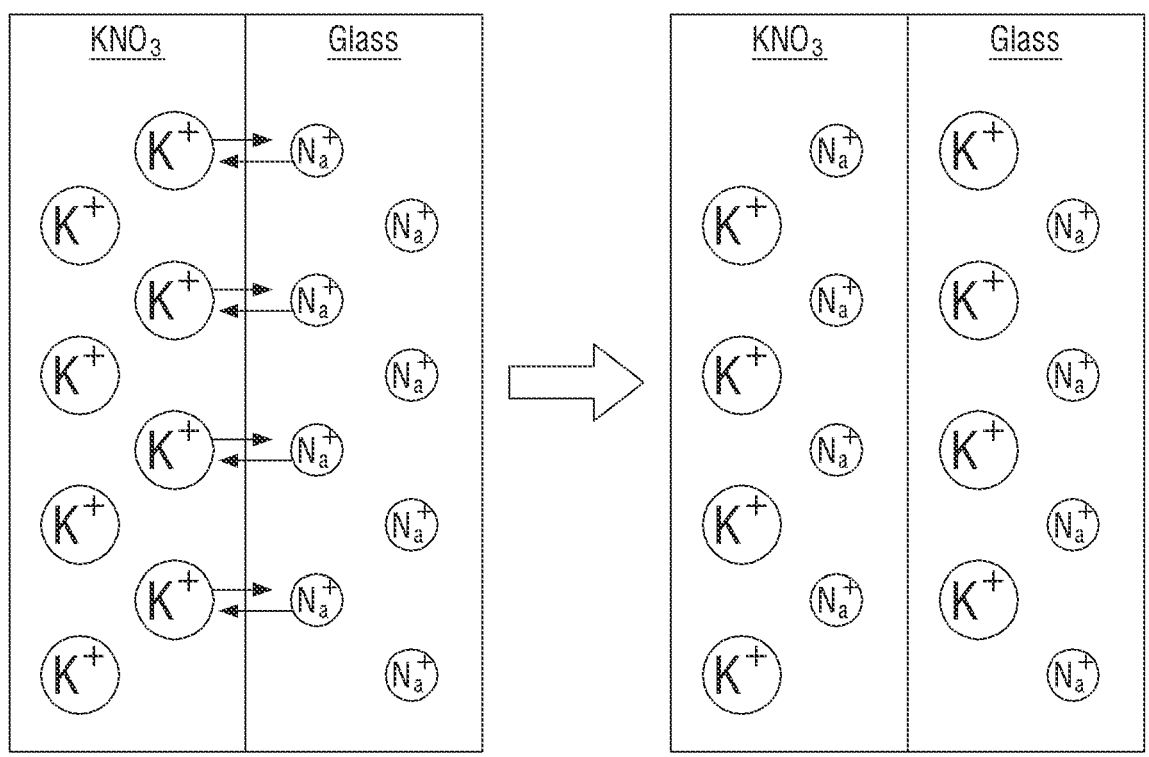
FIG. 6 is a schematic diagram illustrating an ion exchange process according to an embodiment.

FIG. 6 is a schematic diagram illustrating an ion exchange process according to an embodiment. FIG. 6 illustrates a case where sodium ions inside the glass are exchanged with potassium ions.

Referring to FIG. 6, when the glass containing sodium ions is exposed to potassium ions by, for example, immersing the glass in a molten salt bath containing potassium nitrate, sodium ions in the glass are discharged to the outside and the potassium ions may replace them. The exchanged potassium ions generate compressive stress because they have a larger ionic radius than sodium ions. The greater the amount of potassium ions exchanged, the greater the compressive stress. Because the ion exchange takes place through the surface of the glass, the amount (e.g., concentration) of potassium ions at (e.g., on or near) the glass surface may be the greatest (e.g., compared to other portions of the glass article). Although some of the exchanged potassium ions may diffuse into the glass to increase the depth of a compressive region, e.g., a compression depth, the amount of the exchanged potassium ions may generally decrease as it goes away from the surface. Thus, the glass may have a stress profile that has the greatest compressive stress at (e.g., on or near) the surface and decreases toward the inside. However, the present disclosure is not limited to the above examples. The stress profile may be modified depending on the temperature, time, number of times (e.g., number of times of application), presence or absence of heat treatment and/or the like of the ion exchange process.

Referring again to FIGS. 4 and 5, the ion exchange process may be performed two or more times. For example, the ion exchange process may include a primary ion exchange process S51 and a secondary ion exchange process S52. The primary ion exchange process S51 and the secondary ion exchange process S52 may be performed in different baths 51 and 52. Each ion exchange process S51, S52 may be performed concurrently or simultaneously on the plurality of glass cells 10. For example, by immersing the plurality of glass cells 10 in one bath 51 or 52, the ion exchange process may be performed concurrently or simultaneously on the plurality of glass cells 10. The ion exchange process will be described in more detail below.

After the strengthening task S5, selectively, the surface polishing task S6 after the strengthening may be further performed. The surface polishing task S6 after strengthening may remove fine cracks on the surface of the strengthened glass cell 10 and control compressive stress of the first surface and the second surface of the strengthened glass cell 10. For example, a floating method, which is one of suitable methods for producing a glass plate, is performed by flowing a glass composition into a tin bath. In this case, the surface of the glass plate in contact with the tin bath may have a different composition from the surface not in contact with the tin bath. As a result, after the strengthening task S5 of the glass cell 10, a deviation in compressive stress may occur between the surface in contact with the tin bath and the surface not in contact with the tin bath. However, by removing the surface of the glass cell 10 to an appropriate thickness by polishing, it is possible to reduce the deviation in compressive stress between the contact surface and the non-contact surface. For example, the surface of the glass cell 10 that was in contact with the tin bath may be removed (e.g., a thickness of the glass cell 10 at the surface may be removed) to reduce the deviation in compressive stress between the surface that was in contact with the tin bath and the surface that was not in contact with the tin bath.

The surface polishing task S6 after strengthening may be performed by a chemical mechanical polishing method. For example, the first and second surfaces of the strengthened glass cell 10, which is the glass cell 10 to be processed, are polished utilizing a chemical mechanical polishing apparatus 60 and a polishing slurry. The polishing thickness (e.g., the depth into the first and/or second surfaces of the glass cell 10 to be polished) may be set or adjusted, for example, in the range of 100 nm to 1000 nm, but the present disclosure is not limited thereto. As used herein, the term "nm" may refer to a distance equal to $10^{-9}$ meters. The polishing thicknesses of the first surface and the second surface may be the same, but may be different.

After the surface polishing task S6 after strengthening, a shape machining process may be further performed to shape the glass cell 10 into a set or predetermined shape. For example, in the case of producing the glass articles 101 to 103 having the three-dimensional shapes shown in FIG. 1, a three-dimensional machining process may be performed after completion of the surface polishing task S6 after strengthening.

Hereinafter, the stress profile of the strengthened glass article 100 will be described in more detail.

Figure 7:
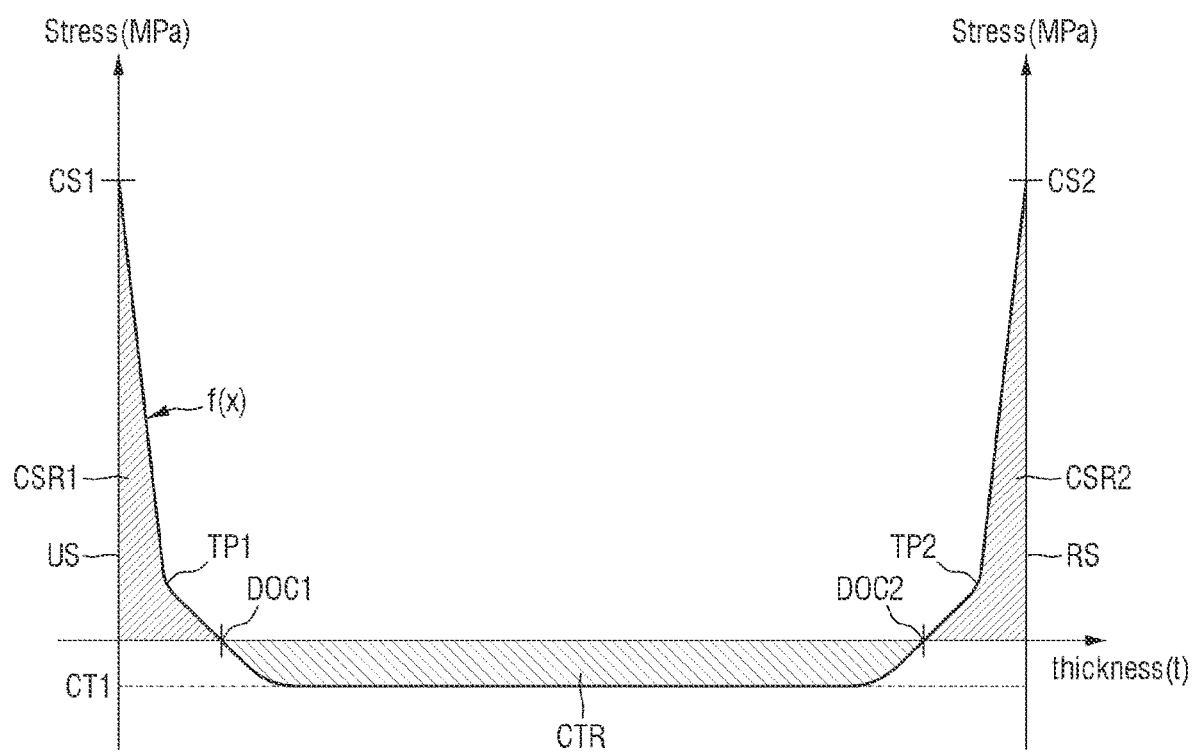
FIG. 7 is a graph showing a stress profile of a glass article according to an embodiment.

FIG. 7 is a graph showing a stress profile of a glass article according to an embodiment. In the graph of FIG. 7, an X-axis represents the thickness direction of the glass article. In FIG. 7, the compressive stress has positive values, while the tensile stress has negative values. Herein, the magnitude of the compressive stress and the tensile stress means the magnitude of an absolute value (e.g., absolute stress value) regardless of its sign.

Referring to FIG. 7, the glass article 100 includes a first compressive region CSR1 extending (or expanding) from the first surface US to a first compression depth DOC1, and a second compressive region CSR2 extending (or expanding) from the second surface RS to a second compression depth DOC2. The tensile region CTR is disposed between the first compression depth DOC1 and the second compression depth DOC2 (e.g., between the first compressive region CSR1 and the second compressive region CSR2). The overall stress profile in the glass article 100 may be symmetrical (e.g., reflectively symmetrical) between both regions of the surfaces US and RS with respect to the center of the direction of the thickness t (e.g., with respect to a plane extending through the center of the glass article 100). A compressive region and a tensile region may be disposed between opposed side surfaces of the glass article 100 in a similar manner.

The first compressive region CSR1 and the second compressive region CSR2 are resistant to an external impact to prevent or reduce the occurrence of cracks or breakage of the glass article 100. As maximum compressive stresses CS1 and CS2 of the first compressive region CSR1 and the second compressive region CSR2 increase, the strength of the glass article 100 generally increases. Because an external impact is usually transmitted through the surface of the glass article 100, it is useful or advantageous to have the maximum compressive stresses CS1 and CS2 at the surface of the glass article 100, in terms of durability. From this perspective, the compressive stress of the first compressive region CSR1 and the second compressive region CSR2 tends to be the largest at the surface and generally decrease toward the inside.

The first compression depth DOC1 and the second compression depth DOC2 suppress or block cracks or grooves formed in the first surface US and the second surface RS from propagating to the tensile region CTR inside the glass article 100. As the first compression depth DOC1 and the second compression depth DOC2 increase, it is possible to more efficiently prevent or block propagation of cracks and the like. The point corresponding to the first compression depth DOC1 and the second compression depth DOC2 corresponds to a boundary between the compressive regions CSR1 and CSR2 and the tensile region CTR, and the stress value of the glass article 100 at this point is zero.

Throughout the glass article 100, the tensile stress of the tensile region CTR may be balanced with the compressive stress of the compressive regions CSR1 and CSR2. For example, the total compressive stress (e.g., the compressive energy) in the glass article 100 may be the same as the total tensile stress (e.g., the tensile energy) in the glass article 100. The stress energy accumulated in one region having a constant width in the thickness t direction in the glass article 100 may be calculated as an integrated value of the stress profile. For example, the stress energy of the region may be an integral of the stress profile over the corresponding width of the region. The stress profile may be a function (e.g., f(x)) that provides a stress value of the glass article 100 as a function of depth (e.g., "x" in f(x)) from a surface of the glass article 100 in the thickness direction. The following relational expression may be established when the stress profile in the glass article 100 having a thickness t is represented as a function f(x).

$$\int_0^t f(x)dx = 0 \qquad \text{Mathematical Expression 1}$$

The greater the magnitude of the tensile stress in the glass article 100, the more likely the fragments are to be vigorously released (e.g., released with greater energy) when the glass article 100 is broken, and the more likely the glass article 100 is to be broken from the inside (e.g., from inside the tensile region CTR). The maximum tensile stress that meets the frangibility (or breakage resistance) requirements of the glass article 100 may satisfy, but is not limited to, the following relationship:

$$CT_1 \leq -38.7 \times \ln(t) + 48.2 \qquad \text{Mathematical Expression 2}$$

In some embodiments, a maximum tensile stress CT1 may be 100 MPa or less, or 85 MPa or less. As used herein, the term "MPa" may refer to a pressure equal to $10^6$ Pascals. In some embodiments, the maximum tensile stress CT1 may be the maximum stress value of the tensile region CTR. The maximum tensile stress CT1 of 75 MPa or more may be desirable to improve mechanical properties such as strength. In an embodiment, the maximum tensile stress CT1 may be greater than or equal to 75 MPa and less than or equal to 85 MPa, but the present disclosure is not limited thereto.

The maximum tensile stress CT1 of the glass article 100 may be generally located at a central portion in the thickness t direction of the glass article 100. For example, the maximum tensile stress CT1 of the glass article 100 may be located at a depth in the range of 0.4 t to 0.6 t, or in the range of 0.45 t to 0.55 t, or at a depth of about 0.5 t.

Meanwhile, in order to increase the strength of the glass article 100, it is preferable that the compressive stress and the compression depths DOC1 and DOC2 may have large values. However, as the compressive energy increases, the tensile energy also increases, and the maximum tensile stress CT1 may increase. In order to meet the fragility (e.g., frangibility) requirements (or breakage resistance) while having high strength, it may be desirable to adjust the stress profile such that the maximum compressive stresses CS1 and CS2 and the compression depths DOC1 and DOC2 have large values while the compressive energy becomes smaller. For example, the stress values of the glass article 100 may be highest at or near the surface of the glass article 100 and may decrease as a function of depth away from the surface of the glass article 100. To this end, each of the first compressive region CSR1 and the second compressive region CSR2 may respectively include a first transition point TP1 and a second transition point TP2 at which the slope of the stress profile changes abruptly. The slope of the stress profile may refer to a rate of change of the stress profile with respect to the depth from the surface of the glass article in the thickness direction. The shape of the stress profile (for example, the shape of the stress profile in the compressive region) can be precisely controlled by adjusting the process conditions of the primary ion exchange process and the secondary ion exchange process.

Hereinafter, a more detailed description of the stress profile of the compressive region will be given with reference to FIGS. 6 and 7. The following description will focus on the stress profile of the first compressive region CSR1. Because the first compressive region CSR1 and the second compressive region CSR2 have a symmetrical relationship (e.g., reflectively symmetrical relationship with respect to a plane extending through the center of the glass article 100) in the stress profile, a repeated description of the stress profile of the second compressive region CSR2 may be simplified or may not repeated. For example, the stress profile of the glass article 100 extending from the first surface US to the first compression depth DOC1 may be substantially the same as the stress profile of the glass article 100 extending from the second surface RS to the second compression depth DOC2.

Figure 8:
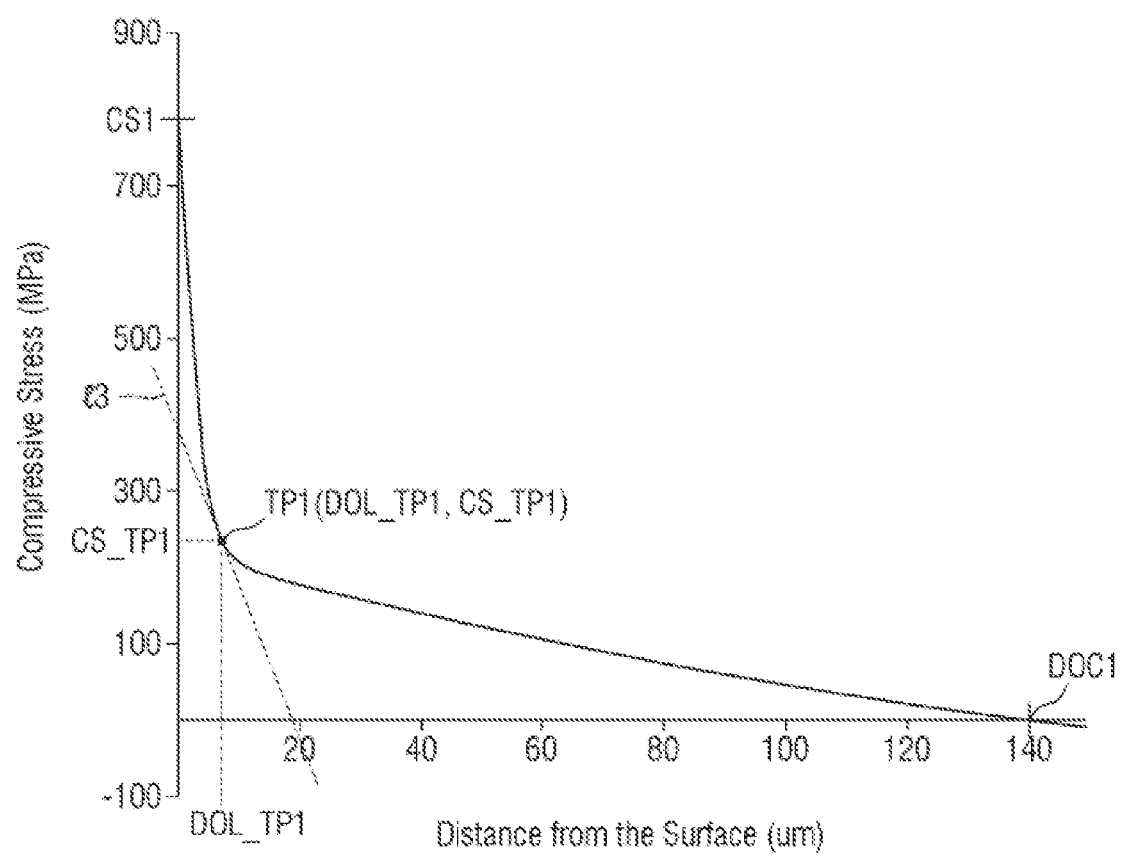
FIG. 8 is an enlarged graph of the vicinity of the first compressive region of FIG. 7.
Figure 9:
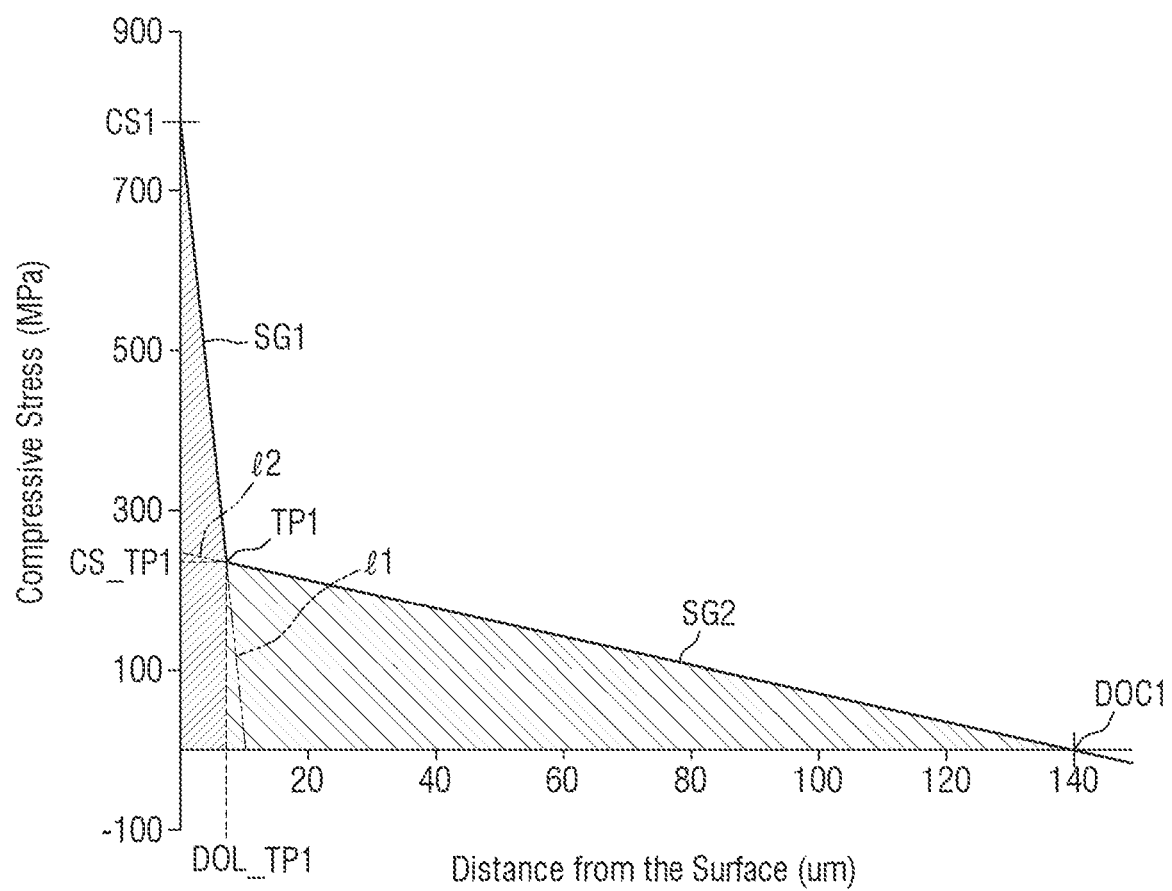
FIG. 9 is a diagram schematically showing a linear graph to which the stress profile of FIG. 8 approximates.

FIG. 8 is an enlarged graph of the vicinity of the first compressive region of FIG. 7. FIG. 9 is a diagram schematically showing a linear graph to which the stress profile of FIG. 8 approximates.

Referring to FIGS. 8 and 9, the stress profile in the first compressive region CSR1 has a negative slope and generally decreases as it goes from the first surface US to the first compression depth DOC1. The stress profile in the first compressive region CSR1 includes at least one first transition point TP1 (or inflection point) at which the slope changes abruptly. For example, the stress profile may have a relatively small radius of curvature at the transition point TP1.

The first transition point TP1 is located between the first surface US and the first compression depth DOC1. The stress profile may be divided into a first segment SG1 and a second segment SG2 based on the first transition point TP1. For example, the stress profile may include the first segment SG1 extending from the first surface US to the first transition point TP1 and the second segment SG2 extending from the first transition point TP1 to the first compression depth DOC1.

The first segment SG1 and the second segment SG2 may be divided by the type or kind of ions penetrated. For example, potassium ions may penetrate only into a depth section of the first segment SG1 located relatively nearer to the first surface US, and may not substantially penetrate into a depth section of the second segment SG2 located relatively inward in the first compressive region CSR1. On the other hand, sodium ions having a smaller ion size than potassium ions may penetrate into not only the depth section of the first segment SG1 but also the depth section of the second segment SG2.

The stress of the first segment SG1 located relatively near to the first surface US in the first compressive region CSR1 may be mainly determined by the density of potassium ions. As described above, the section of the first segment SG1 may further include sodium ions, but the stress of the corresponding section may be mainly dependent on the density of potassium ions having a larger ion size. In the depth section of the first segment SG1, the greater the density of potassium ions, the higher the stress, and the stress profile may substantially approximate to (e.g., may be substantially linearly correlated to) the density profile of potassium ions. The first transition point TP1 may correspond to the maximum penetration depth of potassium ions.

The stress of the second segment SG2 located inward relative to the first compressive region CSR1 may be mainly determined by the density of sodium ions. For example, in the depth section of the second segment SG2, the greater the density of sodium ions, the higher the stress, and the stress profile may substantially approximate to the density profile of sodium ions. The first compression depth DOC1 may substantially correspond to the maximum penetration depth of sodium ions.

The first segment SG1 may substantially approximate to a first straight line $\ell 1$ connecting the coordinates of (e.g., corresponding to) the first transition point TP1 and the coordinates of (e.g., corresponding to) the first surface US in the corresponding section. The first straight line $\ell 1$ may be expressed as a first function in Mathematical Expression 3 below in a coordinate plane with an X-axis indicating depth and a Y-axis indicating stress:

$$y = m_1 x + a \qquad \text{Mathematical Expression 3}$$

Here, $m_1$ is a first slope of the first straight line $\ell 1$, and a is a y-intercept, which represents the compressive stress at the first surface US.

The second segment SG2 may substantially approximate to a second straight line $\ell 2$ connecting the coordinates of (e.g., corresponding to) the first transition point TP1 and the coordinates of (e.g., corresponding to) the first compression depth DOC1 having a stress value of zero in the corresponding section. The second straight line $\ell 2$ may be expressed as a second function in Mathematical Expression 4 below in a coordinate plane with an X-axis indicating depth and a Y-axis indicating stress:

$$y = m_2 x + b \qquad \text{Mathematical Expression 4}$$

Here, $m_2$ is an average slope of the second segment SG2, which is a second slope of the second straight line $\ell 2$, b represents a y-intercept, and $-b/m_2$ is an x-intercept, which represents the first compression depth DOC1.

Some sections of the tensile region CTR adjacent to the first compressive region CSR1 may have a stress profile in conformity with the second straight line t2. For example, the stress profile of a section of the tensile region CTR adjacent to the first compressive region CSR1 may be substantially approximated by the second straight line ℓ2 when extrapolated into the tensile region CTR.

In the above functions, each of the first slope $m_1$ and the second slope $m_2$ has a negative value, and the absolute value of the first slope $m_1$ of the first straight line ℓ1 is greater than the absolute value of the second slope $m_2$ of the second straight line ℓ2. The first segment SG1 may substantially have the first slope $m_1$, and the second segment SG2 may substantially have the second slope $m_2$.

The slope (or gradient) of the stress profile changes abruptly at the first transition point TP1. The first transition point TP1 is located at a point where the first straight line ℓ1 and the second straight line ℓ2 meet (e.g., cross or intersect) each other, but the second segment SG2 and the first segment SG1 in the actual stress profile have an inflection point shape curved around the first transition point TP1. For example, the stress profile of the first compressive region CSR1 may have a smooth curve at and near the first transition point TP1. The stress profile may have a third slope $m_3$ at the first transition point TP1, and the third slope $m_3$ may be calculated as a slope of a tangent line t3 of the stress profile at the first transition point TP1. The third slope $m_3$ may approximate to a slope of a straight line connecting one point of the first segment SG1 adjacent to the first transition point TP1 and one point of the second segment SG2 (e.g., a point of the second segment SG2 adjacent to the first transition point TP1). The tangent line ℓ3 at the first transition point TP1 may be expressed as a third function in Mathematical Expression 5 below:

$$y=m_3x+c$$ Mathematical Expression 5

The third slope $m_3$ has a negative value, and the absolute value of the third slope $m_3$ may be smaller than the absolute value of the first slope $m_1$ and larger than the absolute value of the second slope $m_2$.

In an embodiment, the absolute value of the third slope $m_3$ of the third function may be in the range of 19 MPa/μm to 22 MPa/μm. In addition, the y-intercept c of the third function may be in the range of 350 MPa to 420 MPa. For example, $m_3$ may be about −19.678 MPa/μm and the y-intercept c may be 387.35 MPa. When the third slope $m_3$ and y-intercept of the third function satisfy the above-mentioned ranges, the magnitude of compressive energy and a stress-depth ratio CDR of the first transition point TP1 can easily fall within preferable ranges to be described later.

The first segment SG1 and the second segment SG2 having different slopes may be generated by a plurality of ion exchange processes. The second segment SG2 may be generated through the primary ion exchange process, and the first segment SG1 may be generated through the secondary ion exchange process.

For example, the primary ion exchange process is a process of imparting the compression depths DOC1 and DOC2 to the glass (e.g., imparting ions into the glass by compression depths DOC1 and DOC2), and may be performed generally by exposing the glass to single molten salt containing sodium ions or mixed molten salt containing potassium ions and sodium ions. For example, for the primary ion exchange process, the glass is immersed in a first bath 51 (see FIG. 5) containing single molten salt containing sodium nitrate or mixed molten salt in which potassium nitrate and sodium nitrate are mixed. When utilizing the mixed molten salt, the contents (e.g., concentration) of potassium nitrate and sodium nitrate in the first bath may be similar. For example, the salt ratio (e.g., ratio of moles, weights, etc.) of potassium nitrate to sodium nitrate may be adjusted in the range of 40:60 to 60:40. In an embodiment, the salt ratio of potassium nitrate to sodium nitrate in the mixed molten salt of the primary ion exchange process may be 50:50, but is not limited thereto.

The primary ion exchange process may be performed in the temperature range of ±20° C. of a temperature 50° C. lower than the glass transition temperature (e.g., within a temperature range of 30° C. to 70° C. lower than the glass transition temperature). However, the present disclosure is not limited thereto. For example, when the glass transition temperature is about 580° C., the primary ion exchange process may be performed at a temperature of about 500° C. or more. The primary ion exchange process time may range from 3 hours to 8 hours, but is not limited thereto.

Through the primary ion exchange process, lithium ions and/or sodium ions, which are small ions inside the glass, are exchanged with sodium ions and/or potassium ions, which are larger ions in the molten salt, thereby increasing the concentration of sodium ions and/or potassium ions in the glass. Because the molten salt is provided with lithium ions from the glass, the molten salt of the first bath after the primary ion exchange process may further include lithium ions in addition to sodium ions and potassium ions.

After the primary ion exchange process and before the secondary ion exchange process, a stress relieving process (or annealing process) may be further performed. The stress relieving process may be performed at a temperature of about 500° C. or more for 1 to 3 hours. The stress relieving process may reduce the maximum compressive stress and allow the diffusion of sodium ions (and/or potassium ions) into the glass to increase the compression depth. The stress relieving process may be performed in air or liquid. The stress relieving process may be omitted.

Upon completion of the primary ion exchange process (or, if a stress relieving process is added, then when the stress relieving process is completed), a stress profile corresponding to the second straight line ℓ2 is generated. For example, sodium ions and/or potassium ions of the mixed molten salt are exchanged to penetrate into the glass, and then diffuse in the depth direction (e.g., the thickness direction or towards the center of the glass article). Sodium ions generally diffuse to the first compression depth DOC1 to form the first compressive region CSR1 having a compressive stress from the first surface US to the first compression depth DOC1. For example, the first compression depth DOC1 is determined by the primary ion exchange process and/or the stress relieving process.

Meanwhile, the density of diffusing ions is substantially inversely proportional to the diffusion distance. Because sodium ions and potassium ions enter the glass through ion exchange from the surface of the glass and diffuse in the depth direction, the concentration of sodium ions and potassium ions tends to substantially linearly decrease as it goes away from the first surface US of the glass (e.g., towards the center of the glass article). As a result, the stress profile has the largest stress CS1 at the first surface US of the glass and the stress profile decreases in the depth direction in the same manner as the second straight line ℓ2 (e.g., with the same slope as the second straight line ℓ2).

In addition, the degree of diffusion of ions is inversely proportional to the size of ions. For example, as the size of ions decreases, more ions can diffuse and/or the ions may diffuse further. Therefore, when both sodium ions and potassium ions penetrate into the glass through the primary ion exchange process, sodium ions having a relatively small size may diffuse more readily and penetrate to a deeper level (e.g., compared to potassium ions). Sodium ions may diffuse to the first compression depth DOC1, while potassium ions may diffuse only to a depth smaller than or equal to the first transition point TP1.

As discussed above, the first compression depth DOC1 has a close correlation with the maximum diffusion depth of sodium ions, which are smaller ions (e.g., compared to potassium ions) that are ion-exchanged. The first compression depth DOC1 may be the same as the maximum diffusion depth of sodium ions, or the first compression depth DOC1 may be located in the vicinity thereof even though there is a slight difference. The first compression depth DOC1 may be generally proportional to the maximum diffusion depth of sodium ions. As described above, the primary ion exchange process and/or the stress relieving process is a process of forming a set or predetermined first compression depth DOC1 through sufficient diffusion, and is performed for a sufficiently long time such that ions can be sufficiently diffused.

Meanwhile, as more ion diffusion is performed, the maximum compressive stress CS1 may become smaller. For example, as ions diffuse away from the surface of the glass (e.g., during the stress relieving process), the maximum compressive stress CS1 may decrease due to a decrease in the concentration of ions at the surface of the glass. The maximum compressive stress CS1 increases as the density of ions increases. Thus, if the same amount of ions enter the glass, the more the diffusion, the smaller the density and the smaller the compressive stress. For example, when a set amount of ions enter the glass at the surface of the glass, the density of ions and the compressive stress at the surface of the glass decreases as diffusion increases. As described above, because the primary ion exchange process has limitations to increasing the maximum compressive stress CS1 of the first surface US, the secondary ion exchange process is further performed after the primary ion exchange process in order to form a greater surface compressive stress CS1.

The secondary ion exchange process is a process of increasing the maximum compressive stress CS1, and is generally performed by exposing the glass to single molten salt containing potassium ions or mixed molten salt containing potassium ions and sodium ions. For example, for the secondary ion exchange process, the glass that has undergone the primary ion exchange process is immersed in the second bath 52 (see FIG. 5) containing single molten salt containing potassium nitrate or mixed molten salt in which potassium nitrate and sodium nitrate are mixed. Even when the mixed molten salt is utilized, a salt ratio is set or adjusted such that main ions penetrating into the glass are potassium ions. For example, the content of potassium nitrate in the second bath is greater than that in the primary ion exchange process, and furthermore, the concentration of potassium nitrate may be greater than that of sodium nitrate. For example, the salt ratio (e.g., a ratio of moles, weights, etc.) of potassium nitrate to sodium nitrate in the second bath may be set or adjusted in the range of 80:20 to 98:2. In an embodiment, the salt ratio of potassium nitrate to sodium nitrate in the mixed molten salt of the secondary ion exchange process may be 92:8, but is not limited thereto.

The secondary ion exchange process may be performed at a lower temperature and for a shorter time than the primary ion exchange process. For example, the secondary ion exchange process may be performed for 1 hour to 3 hours, or for 1.3 hours to 2 hours, and may be performed in the temperature range of 380° C. to 460° C.

Through the secondary ion exchange process, it is possible to significantly increase the compressive stress in a shallow depth section of the glass surface, such as the first surface US (e.g., in the first segment SG1 or a portion of the first segment SG1 nearest to the first surface US). For example, when potassium ions penetrate into the glass, the compressive stress in the corresponding portion becomes larger due to the potassium ions having a larger size. Potassium ions which penetrate into the glass diffuse in the depth direction. Compared with the primary ion exchange process, potassium ions have a slower diffusion rate than sodium ions, and the duration of the secondary ion exchange process is shorter than that of the primary ion exchange process. In some embodiments, compared with the primary ion exchange process, a higher percentage of the ions entering the glass in the secondary ion exchange process are potassium ions. Accordingly, the diffusion depth of potassium ions diffused through the secondary ion exchange process may be much smaller than the first compression depth DOC1. The maximum diffusion depth of potassium ions may be equal to or less than the first transition point TP1, as described above.

The stress profile formed by (e.g., formed in part by) the potassium ions additionally penetrated through the secondary ion exchange process has substantially the same shape as in the first straight line $\ell 1$. The compressive stress CS1 of the first surface US is increased through the secondary ion exchange process, while the penetration depth (or the first transition point TP1) of the potassium ions is smaller than the first compression depth DOC1. Thus, the absolute value of the first slope $m_1$ of the first straight line $\ell 1$ is greater than the absolute value of the second slope $m_2$ of the second straight line $\ell 2$. For example, the compressive stress profile may have a slope which is steep in the vicinity of the surface of the glass article 100 (e.g. in the first segment SG1), and becomes gentler (e.g., smaller) toward the interior of the glass article 100 (e.g., in the second segment SG2).

The stress profile in the first compressive region CSR1 as described above may have at least three main feature points.

A first feature point corresponds to the y-intercept of the second straight line $\ell 2$ and is located at (e.g., on) the first surface US. A second feature point corresponds to the x-intercept of the first straight line $\ell 1$, and corresponds to the first compression depth DOC1. A third feature point is located at the first transition point TP1. The position of the feature point is a factor that substantially determines the stress profile. Because the stress profile between the first feature point and the third feature point approximates to the first straight line $\ell 1$, and the stress profile between the second feature point and the third feature point approximates to the second straight line $\ell 2$, when the first feature point, the second feature point and the third feature point are determined, the shape of the stress profile may also be determined.

The first feature point is a point located at (e.g., on) the first surface US, and has an x-coordinate value of 0 and a y-coordinate value which corresponds to the maximum compressive stress CS1. The maximum compressive stress CS1 expressed by the first feature point is associated with the strength of the glass article 100. By increasing the maximum compressive stress CS1, it is possible to prevent or reduce the occurrence of cracks due to external impacts. The maximum compressive stress CS1 is mainly determined by the amount of potassium ions exchanged in the secondary ion exchange process, and may have a certain relationship with the degree of diffusion after ion exchange.

The maximum compressive stress CS1 may be 300 MPa or more. In various embodiments, the maximum compressive stress CS1 may be 350 MPa or more, 400 MPa or more, 450 MPa or more, or 500 MPa or less. In addition, the maximum compressive stress CS1 may be 2000 MPa or less. In various embodiments, the maximum compressive stress CS1 may be 1800 MPa or less, 1500 MPa or less, or 1050 MPa or less. In some embodiments, the maximum compressive stress CS1 may be in the range of 700 MPa to 950 MPa.

The second feature point is a point where the stress value is 0, and has a y-coordinate value of 0 and an x-coordinate value which corresponds to the first compression depth DOC1. The first compression depth DOC1 represented by the second feature point corresponds to the size (or width) of the first compressive region CSR1 of the glass article 100. By increasing the first compression depth DOC1, it is useful or advantageous in preventing or blocking cracks from propagating to the tensile region CTR. From this perspective, the first compression depth DOC1 (i.e., the distance from the first surface US to the first compression depth DOC1) may be 50 μm or more, 80 μm or more, 100 μm or more, or 125 μm or more. As used herein, the term "μm" may refer to a distance equal to $10^{-6}$ meters. On the other hand, if the first compression depth DOC1 is excessively large, the compressive energy and the tensile energy may be excessively large, which may cause failure in satisfying the frangibility (or breakage resistance) requirements. From this perspective, the first compression depth DOC1 may be 250 μm or less, 200 μm or less, 180 μm or less, 150 μm or less, or 135 μm or less. In a preferred embodiment, the first compression depth DOC1 may range from 125 μm to 135 μm.

The first compression depth DOC1 may be controlled mainly by the temperature and time of the primary ion exchange process and/or the stress relieving process. For example, the first compression depth DOC1 may be increased by increasing the time and/or temperature of the primary ion exchange process and/or of the stress relieving process.

The first compression depth DOC1 may be 0.1 t (10% of the thickness t of the glass) or more, 0.15 t or more, or 0.18 t or more with respect to the thickness t of the glass. Further, the first compression depth DOC1 may be 0.25 t or less, 0.23 t or less, or 0.2 t or less with respect to the thickness t of the glass.

The third feature point is located at a set or predetermined depth and has a set or predetermined stress value. The first transition point TP1 represented by the third feature point is associated with the first slope $m_1$ of the first segment SG1 and the second slope $m_2$ of the second segment SG2. The second slope $m_2$ may be determined by process conditions of the primary ion exchange process and the stress relieving process, and the first slope $m_1$ may be determined by process conditions of the secondary ion exchange process.

The x-coordinate value (depth) of the first transition point TP1 has a value between 0 (0 μm) and the first compression depth DOC1, and the y-coordinate value (stress) of the first transition point TP1 has a value between 0 (0 MPa) and the maximum compressive stress (e.g., the maximum compressive stress CS1).

According to the example of the first compression depth DOC1 and the maximum compressive stress CS1 as described above, the depth of the first transition point TP1 may be in the range of greater than 0 μm and less than 8.1 μm, and the stress of the first transition point TP1 may be in the range of greater than 0 MPa and less than 950 MPa. The position of the first transition point TP1 determines the substantial shape of the stress profile in the first compressive region CSR1. In addition, the position of the first transition point TP1 determines the area of the first compressive region CSR1 (e.g., the magnitude of the compressive energy).

If a depth DOL_TP1 of the first transition point TP1 is excessively large, the production cost may increase, the magnitude of compressive energy may be excessively large, and/or mechanical properties such as strength may be degraded. If the depth DOL_TP1 of the first transition point TP1 is excessively small, a section capable of efficiently preventing or blocking the propagation of cracks due to an impact (e.g., a strong impact) may be reduced. In view of the above, the depth DOL_TP1 of the first transition point TP1 may be in the range of 6.1 μm to 8.1 μm.

The ratio of the depth DOL_TP1 of the first transition point TP1 to the first compression depth DOC1 may be in the range of 0.045 to 0.065, or in the range of 0.049 to 0.06. The depth DOL_TP1 of the first transition point TP1 may be in the range of 0.005 t to 0.015 t or in the range of 0.0087 t to 0.0116 t with respect to the thickness t of the glass.

If the stress CS_TP1 of the first transition point TP1 is excessively large, the compressive energy increases and/or the depth of the first transition point TP1 decreases, which makes it difficult to prevent or block the propagation of cracks. If the stress CS_TP1 of the first transition point TP1 is excessively small, the strength (e.g., the strength of the glass) may become excessively small. From this perspective, the stress CS_TP1 of the first transition point TP1 may be in the range of 207 MPa to 254 MPa. The stress CS_TP1 of the first transition point TP1 may be in the range of 0.218 times to 0.363 times the maximum compressive stress CS1, or in the range of 0.267 times to 0.296 times the maximum compressive stress CS1.

In addition to the depth DOL_TP1 and the stress CS_TP1 of the first transition point TP1, the ratio of the stress CS_TP1 to the depth DOL_TP1 (hereinafter, referred to as a stress-depth ratio CDR) of the first transition point TP1 is a major factor in determining a proportion of the compressive energy (e.g., a value obtained by integrating each segment) of each segment SG1, SG2 in the stress profile.

Figure 10:
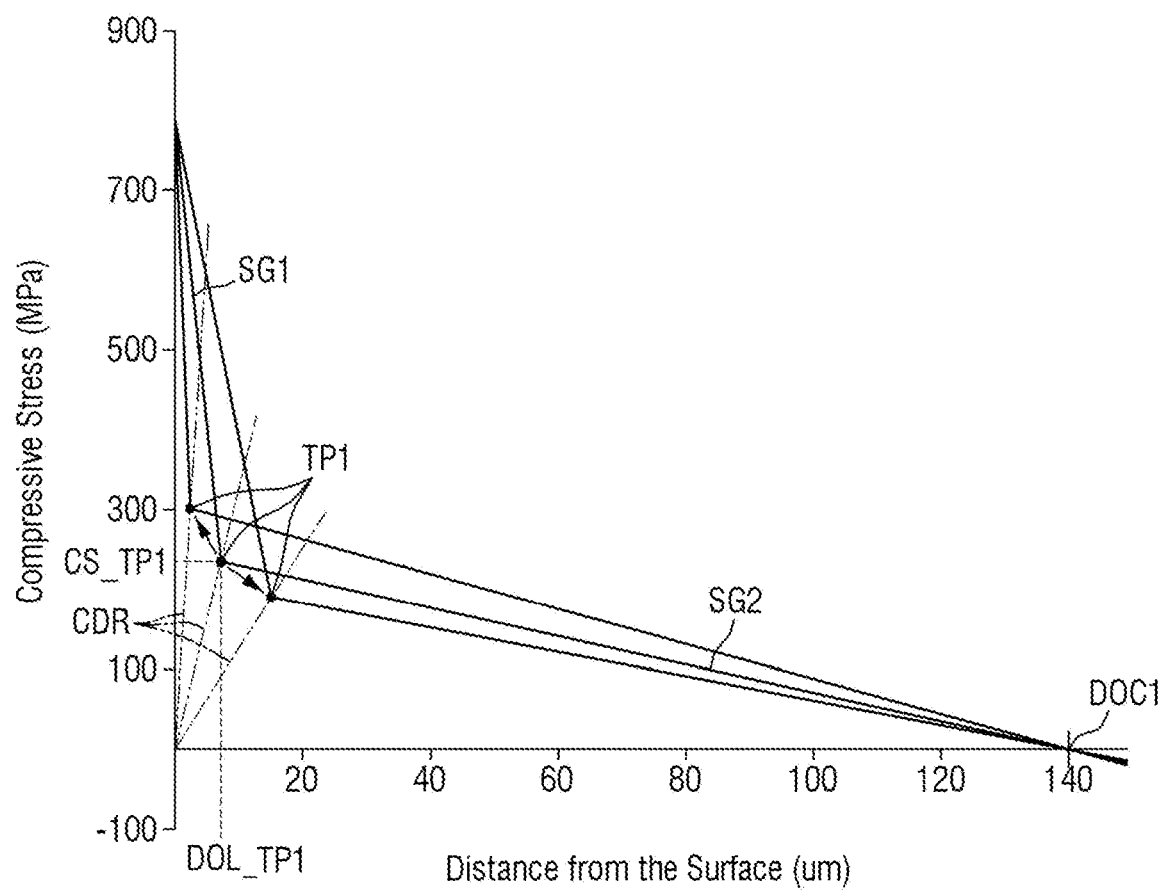
FIG. 10 is a schematic diagram showing stress profiles according to various stress-depth ratios of the first transition point.

FIG. 10 is a schematic diagram showing stress profiles according to various stress-depth ratios of the first transition point. Referring to FIGS. 8, 9 and 10, as the stress-depth ratio CDR of the first transition point TP1 increases, the depth DOL_TP1 of the first transition point TP1 decreases relatively and/or the stress CS_TP1 of the first transition point TP1 increases relatively. Further, first compressive energy (or surface compressive energy) of the first segment SG1 decreases relatively, but second compressive energy (or internal compressive energy) of the second segment SG2 increases relatively. On the other hand, when the stress-depth ratio CDR of the first transition point TP1 decreases, the opposite tendency is exhibited.

According to the experimental findings, when the depth DOL_TP1 of the first transition point TP1 is in the range of 6.1 μm to 8.1 μm, the stress CS_TP1 of the first transition point TP1 is in the range of 207 MPa to 254 MPa. Moreover, as the stress-depth ratio CDR of the first transition point TP1 increases, the mechanical properties such as strength are improved. If the stress-depth ratio CDR of the first transition point TP1 is 28 MPa/μm or more, it can exhibit a significant strength improvement effect in a glass impact test (GIT). On the other hand, when the stress-depth ratio CDR of the first transition point TP1 is excessively large, the depth DOL_TP1 of the first transition point TP1 becomes smaller and the section corresponding to the first segment SG1 becomes excessively narrow. Because it is difficult to precisely form the stress profile, there may be a lot of deviation between products. In addition, if the stress-depth ratio CDR of the first transition point TP1 is excessively large, the section capable of efficiently preventing or blocking the propagation of cracks due to a strong impact may be reduced, and the second compressive energy may be further increased to excessively increase the overall compressive energy and tensile energy. From this perspective, the stress-depth ratio CDR of the first transition point TP1 may be preferably adjusted in the range of smaller than or equal to 35 MPa/μm. When the stress-depth ratio CDR of the first transition point TP1 is in the range of 28 MPa/μm to 35 MPa/μm as described above, the second compressive energy is greater than the first compressive energy and may be about 2 to 5 times or 3 to 4 times the first compressive energy.

Figure 11:
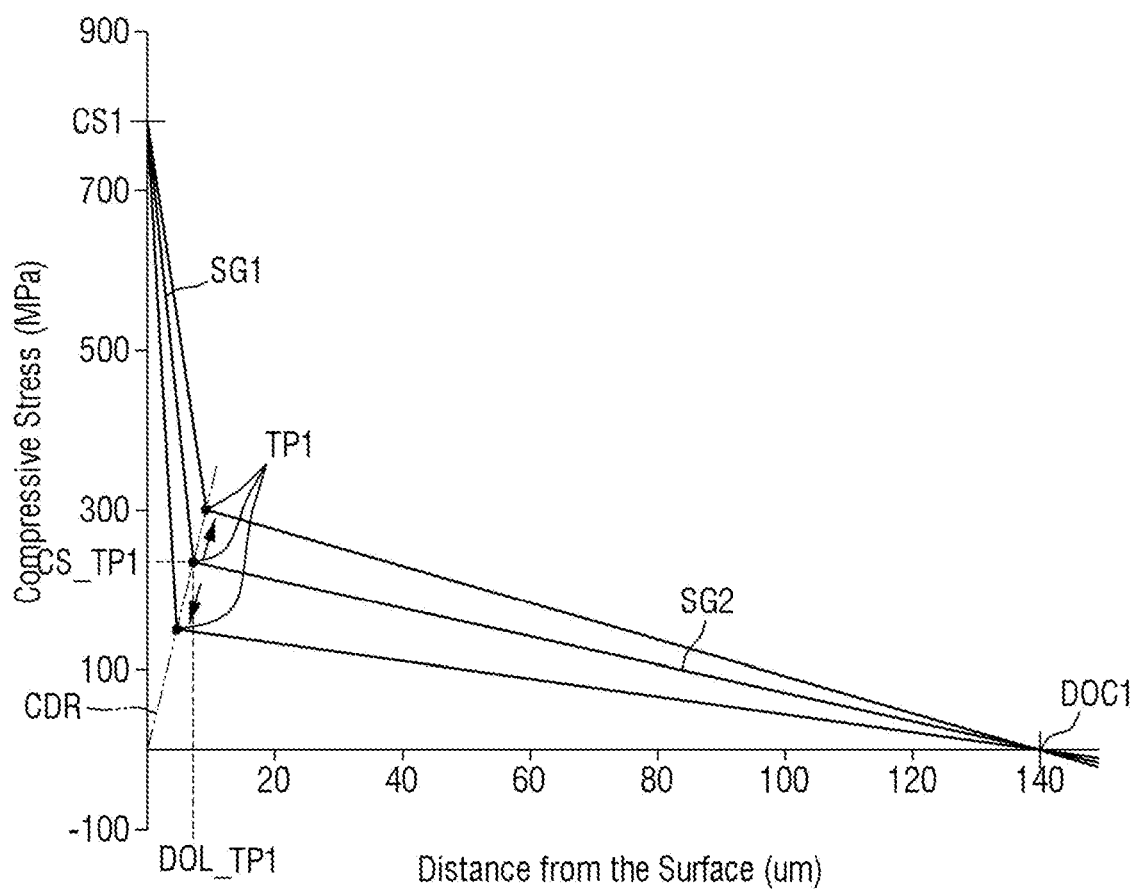
FIG. 11 is a schematic diagram showing stress profiles having various compressive energies at the same stress-depth ratio of the first transition point.

FIG. 11 is a schematic diagram showing stress profiles having various compressive energies at the same stress-depth ratio of the first transition point.

Referring to FIGS. 8 to 11, even when the maximum compressive stress CS1, which is the first feature point, and the first compression depth DOC1, which is the second feature point, are fixed, and the stress-depth ratio CDR of the first transition point TP1 corresponding to the third feature point has a set or specific value, the compressive energy and the tensile energy may be changed by the actual coordinates of the first transition point TP1. For example, even when the maximum compressive stress CS1 and the first compression depth DOC1 are set or fixed, the compressive energy and the tensile energy may have various suitable values. If both the stress CS_TP1 and the depth DOL_TP1 of the first transition point TP1 increase while maintaining the stress-depth ratio CDR, the stress profile is located at a relatively upper part (e.g., the stress profile generally increases), and thus, the area under the graph increases to increase the compressive energy and the tensile energy. A certain increase in compressive energy is useful or advantageous in improving mechanical properties. For example, when the total compressive energy obtained by adding the first compressive energy and the second compressive energy of the first compressive region CSR1 is 12,800 J/mm 2 or more, there is an effect of improving mechanical properties in the glass impact test. On the other hand, an excessive increase in tensile energy may cause failure in satisfying the frangibility (or breakage resistance) requirements of the glass article 100. From this perspective, it is preferable that the total compressive energy obtained by adding the first compressive energy and the second compressive energy of the first compressive region CSR1 has a value of 15,645 J/mm 2 or less. With respect to the second compressive energy, the range of the second compressive energy capable of improving the mechanical property and satisfying the frangibility (or breakage resistance) requirements may be from 9,334 J/mm² to 12,141 J/mm². Further, with respect to the first compressive energy, the range of the first compressive energy capable of improving the mechanical property and satisfying the frangibility (or breakage resistance) requirements may be from 2,866 J/mm² to 3,504 J/mm². The tensile energy is the sum of the compressive energy of the first compressive region CSR1 and the compressive energy of the second compressive region CSR2, and may be equal to twice the compressive energy of each compressive region. Thus, in consideration of the mechanical property and frangibility (or breakage resistance) requirements, the tensile energy may range from 25,600 J/mm² to 31,290 J/mm².

The compressive stress, the first compression depth DOC1, the tensile stress, the first transition point TP1 and the like as described above may be measured by a surface stress meter (FSM) and/or a scattered light polarizer (SLP).

For example, the first segment SG1 associated with the surface compressive stress CS1 and the first transition point TP1 may be measured by a surface stress meter (FSM) such as FSM-6000LE manufactured by Orihara Industrial Co., Ltd. (Japan). The surface stress meter may measure the density of potassium ions in the glass article 100. Therefore, the first segment SG1 of the stress profile may be estimated by measuring the density of potassium ions from the first surface US of the glass article 100 to the first transition point TP1, which is the maximum penetration depth of potassium ions.

The first compression depth DOC1 may be measured by a scattered light polarizer (SLP) such as SLP-1000 manufactured by the above-mentioned company (Orihara Industrial Co., Ltd. (Japan)). SLP-1000 is utilized to check the depth of deep stress in chemically strengthened glass having a lithium aluminosilicate composition. The scattered light polarizer (SLP) may measure the deep compressive stress and internal stress of the glass article 100 utilizing polarization. Stress profile information may be obtained by combining the results of the compressive stress near the surface measured by the surface stress meter (FSM) with the measurement results of the scattered light polarizer (SLP). Further, the tensile stress is the largest at the center of the glass article 100, and has a stress value of zero when it reaches the first compression depth DOC1. Therefore, a point where the stress value measured by the scattered light polarizer (SLP) is zero may be estimated as the first compression depth DOC1, and the second segment SG2 may be estimated by connection from the first compression depth DOC1 to the first transition point TP1.

It is obvious that the method of measuring the stress profile is not limited to the above-mentioned method, and it may be measured by various other suitable apparatuses and methods known or available in the art.

Hereinafter, the embodiments will be described in more detail through Production Example and Experimental Examples.

Production Example 1: Production (1) of Strengthened Glass

A plurality of plate-shaped glass substrates having a thickness of 0.80 mm and having a lithium aluminosilicate composition were prepared, and divided into Sample Groups #1, #2 and #3. Then, a chemical strengthening process was performed on each sample group.

Specifically, a primary ion exchange process was performed on the glass substrates by immersing them in a first molten salt bath in which potassium nitrate and sodium nitrate are mixed, and a secondary ion exchange process was performed on the glass substrates by immersing them in a second molten salt bath containing potassium nitrate. For comparison of strengths according to stress profiles, the ion exchange process was performed on each sample group in a different bath such that each sample group has a different stress profile, with difference in (e.g., depending on differences in) temperature and time of the ion exchange process. The process conditions were adjusted such that the maximum compressive stress of each sample group corresponds to 800 MPa±20 MPa.

Figure 12:
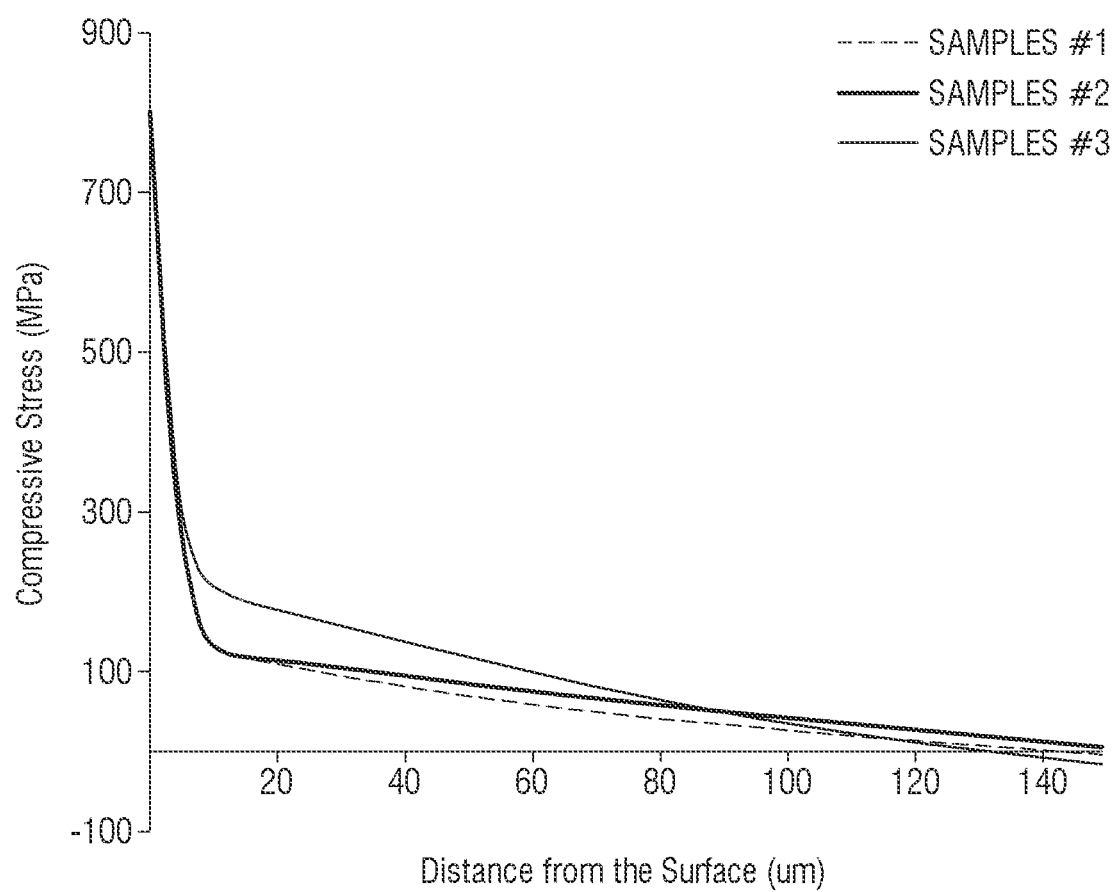
FIG. 12 is a graph showing stress at each position in the thickness direction of Sample Groups #1, #2 and #3.

With respect to the glass substrates on which the strengthening process has been completed, the stress at each position in the thickness direction was measured by FSM-6000LE and SLP-1000, and the results are shown in Table 1 below and shown in FIG. 12.

TABLE 1

| Sample Group | #1 | #2 | #3 |
|---|---|---|---|
| Maximum compressive stress (MPa) | 797.4 | 801.5 | 783.7 |
| Compressive stress (MPa) at transition point | 141.7 | 147.9 | 230.8 |
| Maximum tensile stress (MPa) | 58.1 | 70.4 | 81.4 |
| Transition point depth (μm) | 9.3 | 8.6 | 7.4 |
| First compression depth (μm) | 142.8 | 156 | 130.6 |
| Stress-depth ratio (MPa/μm) at transition point | 15.3 | 17.3 | 31.3 |
| Compressive energy (J/mm$^2$) | 10071.2 | 11838.1 | 14223.3 |

In addition, a tangent line equation at the transition point of each sample group was calculated as follows.

TABLE 2

| Sample Group | Tangent line equation at transition point |
|---|---|
| #1 | y = −10.902x + 246.56 |
| #2 | y = −17.853x + 310.13 |
| #3 | y = −19.678x + 387.35 |

Experimental Example: BOR (ball weight: 60 g) Test

A ball-on-ring (BOR) test was performed on Sample Groups #1, #2 and #3 whose maximum compressive stress corresponds to 800 MPa±20 MPa. For the evaluation according to Experimental Example, 30 samples for each of Sample Groups #1, #2 and #3 were prepared. The BOR drop test was performed by placing and fixing a strengthened glass sample on a ring, and then dropping a ball of 60 g onto the surface of the sample to check the height at which the sample is broken. The drop height of the ball was in a range of 30 cm to 100 cm. As used herein, the term "cm" may refer to a distance equal to $10^{-2}$ meters. If a crack does not occur when dropping the ball, the ball drop was repeated by increasing the height by 5 cm. Finally, when a crack has occurred, the height (e.g., the maximum height at which no crack occurred) immediately before the occurrence of the crack was determined as a limited drop height (or critical drop height). The results thereof are shown in FIG. 13.

Figure 13:
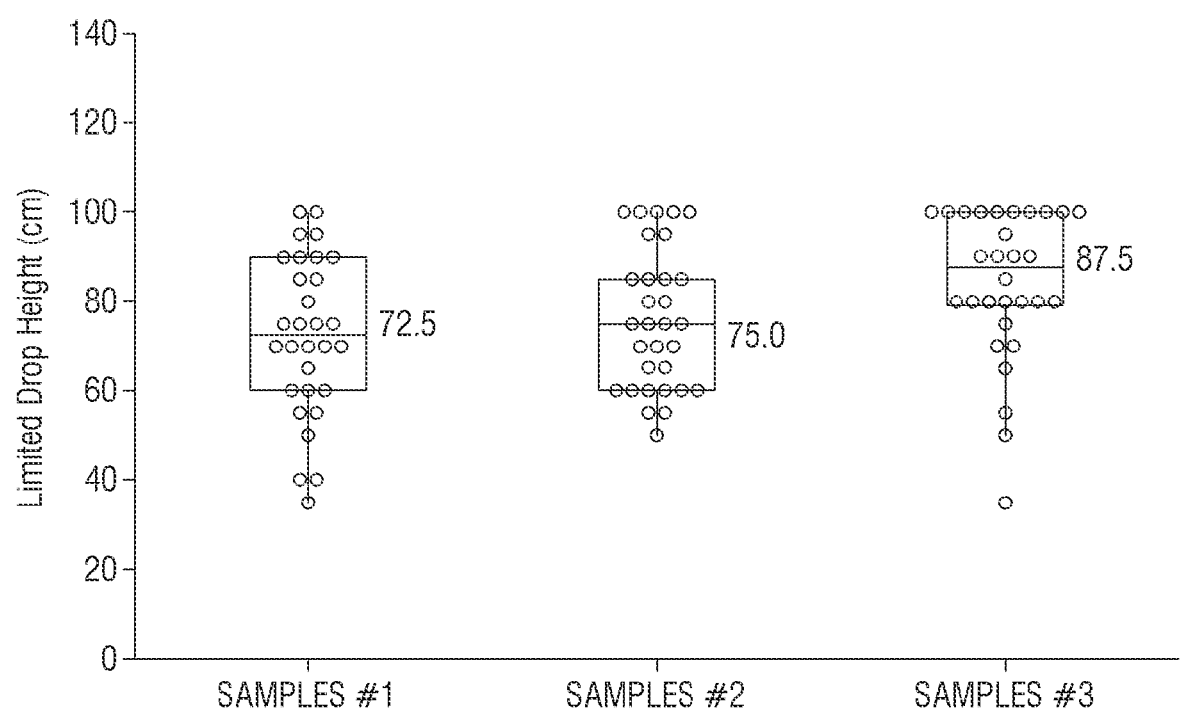
FIG. 13 is a graph showing the results of a BOR test of Sample Groups #1, #2 and #3.

Referring to FIG. 13, a median of the limited drop height in Sample Group #1 was measured to be 72.5 cm, and a median of the limited drop height in Sample Group #2 was measured to be 75 cm. On the other hand, a median of the limited drop height in Sample Group #3 having a smaller maximum compressive stress than Sample Group #1 and Sample Group #2 was measured to be 87.5 cm. Thus, Sample Group #3 was evaluated to have a much higher surface strength than Sample Groups #1 and #2. For example, in the BOR test utilizing a ball of 60 g for 10 or more samples, Sample Group #3 exhibited a median limited drop height of 80 cm or more, which indicates that it has an excellent surface strength.

While the present disclosure has been illustrated and described with reference to embodiments thereof, it will be understood by those of ordinary skill in the art that various suitable changes in form and detail may be made therein without departing from the spirit and scope of the present disclosure as defined by the following claims and equivalents thereof. The embodiments should be considered in a descriptive sense only and not for purposes of limitation.

What is claimed is:

1. A display device comprising:
a display panel including a plurality of pixels;
a cover window above the display panel; and
an optically transparent bonding layer between the display panel and the cover window,
wherein the cover window comprises:
a first surface;
a second surface opposed to the first surface;
a first compressive region extending from the first surface to a first compression depth;
a second compressive region extending from the second surface to a second compression depth; and
a tensile region between the first compression depth and the second compression depth,
wherein a stress profile of the first compressive region includes a first segment located between the first surface and a first transition point and a second segment located between the first transition point and the first compression depth,
wherein a depth from the first surface to the first transition point ranges from 6.1 μm to 8.1 μm,
wherein a compressive stress at the first transition point ranges from 207 MPa to 254 MPa, and
wherein a stress-depth ratio at the first transition point ranges from 28 MPa/μm to 35 MPa/μm, and
wherein a compressive energy of the first compressive region ranges from 12,800 J/mm$^2$ to 15,645 J/mm$^2$.

2. The display device of claim 1, wherein the cover window includes a glass article containing lithium aluminosilicate and having a thickness of 0.45 mm to 0.8 mm,
wherein a first compressive energy of the first segment ranges from 2,866 J/mm$^2$ to 3,504 J/mm$^2$,
wherein a second compressive energy of the second segment ranges from 9,334 J/mm$^2$ to 12,141 J/mm$^2$,
wherein a compressive stress at the first surface ranges from 700 MPa to 950 MPa, and
wherein the first compression depth ranges from 125 μm to 135 μm.

3. The display device of claim 2, wherein the second compressive energy has a magnitude of 2 to 5 times the first compressive energy.

4. The display device of claim 1, wherein the depth of the first transition point is 0.045 to 0.065 times the first compression depth.

5. The display device of claim 1, wherein the first segment has a first slope,
wherein the second segment has a second slope,
wherein a tangent line of the stress profile at the first transition point has a third slope, and
wherein an absolute value of the third slope is smaller than an absolute value of the first slope and greater than an absolute value of the second slope.

6. The display device of claim 5, wherein the absolute value of the third slope is in a range of 19 MPa/μm to 22 MPa/μm.

7. The display device of claim 6, wherein a y-intercept of the tangent line of the stress profile at the first transition point is in a range of 350 MPa to 420 MPa.

8. The display device of claim 1, wherein the first compression depth is a maximum penetration depth of sodium ions, and
wherein the depth of the first transition point is a maximum penetration depth of potassium ions.

9. The display device of claim 1, wherein a stress profile of the second compressive region has a symmetrical relationship with the stress profile of the first compressive region.

10. The display device of claim 1, wherein a maximum tensile stress of the tensile region is in a range of 75 MPa to 85 MPa.

11. The display device of claim 1, wherein a median of a limited drop height is greater than or equal to 80 cm in a ball-on-ring (BOR) test of the display device utilizing a ball of 60 g for 10 or more samples.

12. The display device of claim 1, wherein the compressive stress at the first transition point is 0.267 to 0.296 times the compressive stress at the first surface.

* * * * *